US012724501B2

(12) United States Patent
Chin et al.

(10) Patent No.: US 12,724,501 B2
(45) Date of Patent: *Sep. 1, 2026

(54) INPUT DEVICE AND A METHOD FOR PROVIDING A SCROLLING INPUT TO A COMPUTING DEVICE

(71) Applicant: RAZER (ASIA-PACIFIC) PTE. LTD., Singapore (SG)

(72) Inventors: Wooi Liang Chin, Singapore (SG); Kah Yong Lee, Singapore (SG); Jian Yao Lien, Singapore (SG); Farrukh Raza Rizvi, Singapore (SG); Chang Sern Gwee, Singapore (SG); Allen Zhang, Shenzhen (CN)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,896

(22) Filed: Jul. 9, 2024

(65) Prior Publication Data

US 2024/0361851 A1 Oct. 31, 2024

Related U.S. Application Data

(63) Continuation of application No. 18/027,859, filed as application No. PCT/CN2021/116988 on Sep. 7, (Continued)

(51) Int. Cl.
*G06F 3/0362* (2013.01)
*G06F 3/0354* (2013.01)

(52) U.S. Cl.
CPC ........ *G06F 3/0362* (2013.01); *G06F 3/03543* (2013.01)

(58) Field of Classification Search
CPC .. G06F 3/03543; G06F 3/0485; G06F 3/0484; G06F 3/038; G06F 3/0362;
(Continued)

(56) References Cited

U.S. PATENT DOCUMENTS 5,696,537 A 12/1997 Soljhell
6,380,927 B1 * 4/2002 Ostrum ................. G06F 3/0362 345/165

(Continued)

FOREIGN PATENT DOCUMENTS

TW 201741819 A 12/2017
WO 2008091122 A1 7/2008
WO 2018231145 A1 12/2018

OTHER PUBLICATIONS

International Search report issued for PCT/SG2017-050299 mailed Feb. 21, 2018.

(Continued)

*Primary Examiner* — Dong Hui Liang
(74) *Attorney, Agent, or Firm* — Polsinelli PC

(57) ABSTRACT

An input device (900) may include a rotatable member (952), a virtual scroll controller (912) and a host interface block (906). The virtual scroll controller (912) may be configured to select a virtual scroll state from a plurality of virtual scroll states based on a rotational velocity of the rotatable member (952). Each virtual scroll state may be associated with a respective output function. The virtual scroll controller (912) may be further configured to compute an output velocity according to the output function associated with the selected virtual scroll state. The virtual scroll controller (912) may be further configured to generate a virtual position count (928) based on the computed output velocity. The host interface block (906) may be configured (Continued)

to send the generated virtual position count (928) to a computing device connected to the input device (900).

20 Claims, 19 Drawing Sheets

Related U.S. Application Data

2021, now Pat. No. 12,105,901, which is a continuation of application No. 17/030,211, filed on Sep. 23, 2020, now Pat. No. 11,243,623, which is a continuation-in-part of application No. 16/619,739, filed on Dec. 5, 2019, now Pat. No. 10,838,524.

(58) Field of Classification Search
CPC ............... G06F 3/04855; G06F 3/0383; G06F 3/04812; G06F 21/554; G06F 21/32; G06F 21/316; G06F 21/83; G06F 11/3438
See application file for complete search history.

(56) References Cited

U.S. PATENT DOCUMENTS 6,714,221 B1 * 3/2004 Christie ................ G06F 3/0485 715/787
6,987,505 B1 1/2006 Koo
7,061,471 B2 6/2006 Bohn
7,075,516 B2 7/2006 Bohn
7,079,110 B2 7/2006 Ledbetter et al.
8,446,366 B2 5/2013 Blandin et al.
8,803,804 B2 8/2014 Kao
9,389,705 B2 7/2016 Young et al.
10,838,524 B2 11/2020 Unnikrishnan et al.
2003/0197680 A1 * 10/2003 Davenport .......... G06F 3/03543 345/163
2003/0201979 A1 10/2003 Sandage et al.
2006/0033716 A1 2/2006 Rosenberg et al.
2006/0038784 A1 * 2/2006 Hinckley ................ G06F 3/038 345/163
2006/0082551 A1 4/2006 Chang et al.
2006/0250364 A1 11/2006 Gorbunov
2007/0188453 A1 8/2007 O'Sullivan
2010/0079376 A1 4/2010 Lou
2010/0164908 A1 * 7/2010 Hill ....................... G06F 3/0362 345/184
2012/0026090 A1 * 2/2012 Zielke ................. G06F 3/03543 345/163
2012/0249426 A1 10/2012 Lin et al.
2013/0321272 A1 12/2013 Deng
2014/0333536 A1 11/2014 Tee et al.
2015/0363014 A1 12/2015 Wang et al.
2017/0262083 A1 9/2017 Huang et al.
2018/0267629 A1 9/2018 Lin et al.
2019/0018561 A1 1/2019 Chen
2020/0004352 A1 1/2020 Mcloughlin et al.
2020/0159341 A1 5/2020 Unnikrishnan et al.
2021/0004091 A1 1/2021 Rizvi et al.

OTHER PUBLICATIONS

Saitek Cybong Mouse User Manual [http://www.saitek.com/manuals/Cybong%20_mouse_manual.pdf]; 2008; 15 pages.
Logitech MX Master Wireless Mouse [http://www.logitech.com/en-us/product/mx-master]; 2017; 10 pages.
First Office Action mailed Nov. 26, 2025 in corresponding Taiwanese Patent Application No. 111129046 (17 pages).

* cited by examiner

INPUT DEVICE AND A METHOD FOR PROVIDING A SCROLLING INPUT TO A COMPUTING DEVICE

CROSS-REFERENCE TO RELATED APPLICATIONS

This application is a continuation of and claims the benefit of U.S. application Ser. No. 18/027,859, filed on Mar. 22, 2023, which is a national stage entry of application number PCT/CN2021/116988, filed on Sep. 7, 2021, which is a continuation of application Ser. No. 17/030,211 filed on Sep. 23, 2020, which is a continuation-in-part of application Ser. No. 16/619,739 filed Dec. 5, 2019. All of which are expressly incorporated by reference herein in their entireties.

TECHNICAL FIELD

Embodiments generally relate to an input device and a method for providing a scrolling input to a computing device.

BACKGROUND

Input devices for communication with a processor-based device generally include mice, track balls, joysticks, hand-held controllers, touch pads, keyboards, or the like. These input devices are typically used to provide inputs to the processor-based device such that a user may interact with a graphical user interface (GUI) of an application running on the processor-based device. The input devices may include a rotatable member, such as a scroll wheel, for the user to scroll through lines of texts or various graphical objects in a page of the application. The achievable scrolling speed in the application, for example, the number of lines scrolled through per second, is typically directly linked to and limited by the angular velocity of the scroll wheel. The maximum achievable angular velocity of the scroll wheel depends on the mechanical design of the scroll wheel which is constrained by size, weight, and cost. Depending on the type of application the user is using, for example from gaming applications to document processing applications, the user may desire to scroll at a faster speed than allowable by the mechanism of the scroll wheel, or to scroll through a long page with less effort. This may not be achievable with the existing input devices.

SUMMARY

According to various embodiments, an input device may be provided. The input device may include a rotatable member, virtual scroll controller and a host interface block. The virtual scroll controller may be configured to select a virtual scroll state from a plurality of virtual scroll states based on a rotational velocity of the rotatable member. Each virtual scroll state may be associated with a respective output function. The virtual scroll controller may be further configured to compute an output velocity according to the output function associated with the selected virtual scroll state. The virtual scroll controller may also be configured to generate a virtual position count based on the computed output velocity. The host interface block may be configured to send the generated virtual position count to a computing device connected to the input device.

According to various embodiments, a method of providing a scrolling input to a computing device may be provided. The method may include selecting a virtual scroll state from a plurality of virtual scroll states based on a rotational velocity of a rotatable member of an input device. Each virtual scroll state may be associated with a respective output function. The method may further include computing an output velocity according to the output function associated with the selected virtual scroll state, generating a virtual position based on the computed output velocity, and sending the generated virtual position count to a computing device connected to the input device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Figure 1A:
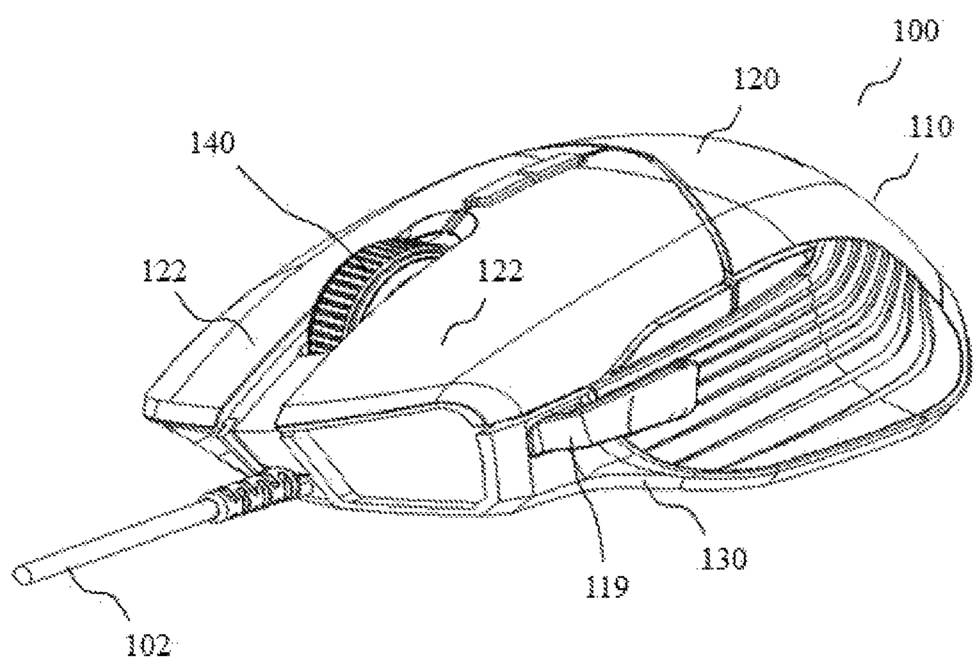
FIG. 1A shows a perspective front view of an input device, in the form of a mouse, for communication with a processor-based device according to various embodiments.

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments of an input device for communication with a processor-based device, such as a computer, have been provided to address at least some of the issues identified earlier.

Various embodiments of an input device for communication with a processor-based device may include a scroll wheel and a user adjustable roller on a base of the input device that allows a user to smoothly or gradually vary a detent force acting on the scroll wheel over a range from a predetermined maximum detent force to zero detent force (or free-wheeling). Accordingly, the user adjustable roller may be configured to interact with the scroll wheel such that the scroll wheel may have a smooth transition from the predetermined maximum detent force to the zero detent force. Hence, the detent force acting on the scroll wheel may be adjusted by the user to a desired force that may be equal to the predetermined maximum detent force, or equal to the zero detent force, or of any magnitude between the predetermined maximum detent force and zero detent force. In other words, the input device of the various embodiments may include a mechanism or means for the user to provide a rotary input motion (e.g. via the user adjustable roller or an electric motor) such that the user may switch a mechanical operation mode of the scroll wheel between a resistive-wheeling mode and a free-wheeling mode. Further, in the resistive-wheeling mode, the mechanism or means may allow the user to provide the rotary input motion for adjusting or varying the detent force so as to adjust the resistance of the scroll wheel. According to various embodiments, the user may adjust a ratchet mechanism, via rotating the roller, in order to provide the rotary input motion to achieve a finer control over the detent force exerted on the scroll wheel. The ratchet mechanism may be on the base of the input device.

Various embodiments of an input device for communication with a processor-based device may include a scroll wheel and a roller wheel as the mechanism or means for providing the rotary input motion. The roller wheel may be partially engageable by the user through a recess on the base of the mouse, and connected to a slider mechanism that converts rotary motion to linear motion to engage the scroll wheel. The roller wheel may allow the user easier access and finer control over force exerted on the scroll wheel.

Various embodiments of an input device for communication with a processor-based device may include a detent mechanism having a roller wheel for providing the rotary input motion, a slider mechanism and a lever spring. The detent mechanism may convert the rotary motion of the roller wheel to a linear motion for controlling a detent force exerted on the scroll wheel or to switch between the resistive-wheeling mode and the free-wheeling mode.

Figure 1B:
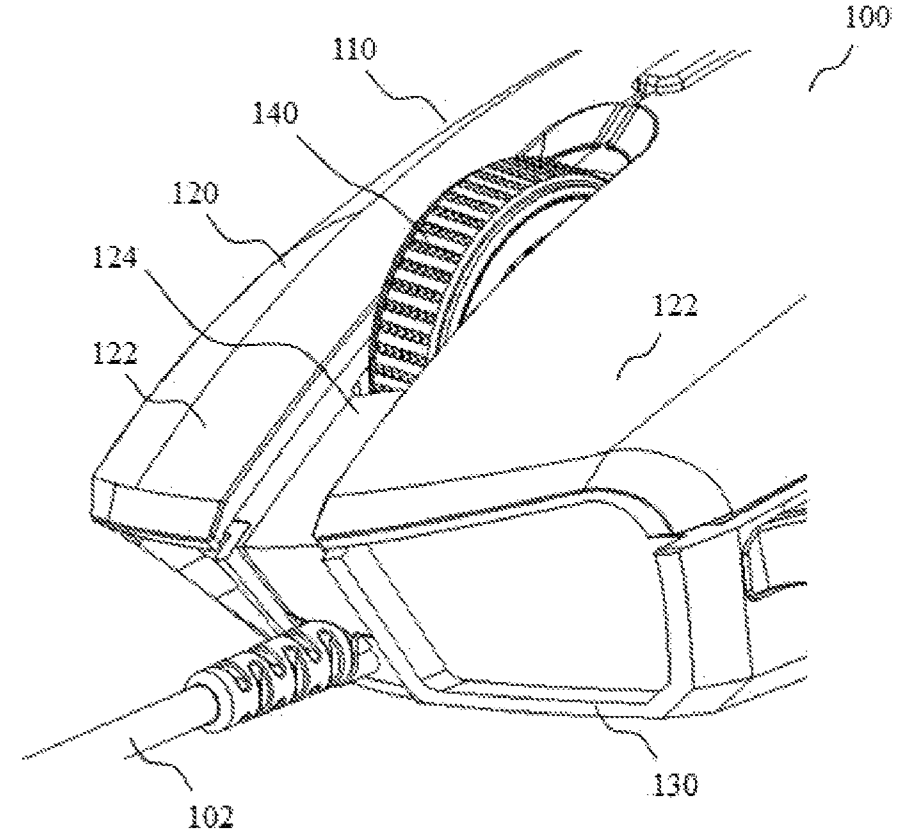
FIG. 1B shows an enlarged perspective front view of a front portion of the mouse of FIG. 1A according to various embodiments.

FIG. 1A shows a perspective front view of an input device, in the form of a mouse 100, for communication with a processor-based device according to various embodiments. FIG. 1B shows an enlarged perspective front view of a front portion of the mouse 100 of FIG. 1A according to various embodiments. In addition of being in the form of the mouse 100 as illustrated in the various drawings, the input device according to various embodiments may also be in the form of a track ball, a joystick, a handheld controller, a touch pad, a keyboard, a computer mouse or the like.

As shown in FIG. 1A and FIG. 1B, the input device in the form of the mouse 100 may include a housing 110. The housing 110 may be an exterior casing of the mouse 100. Further, the housing 110 may include a cover portion 120 and a base portion 130. The cover portion 120 and the base portion 130 may be two separate parts of the housing 110. The cover portion 120 of the housing 110 may be a top case cover of the exterior casing of the mouse 100. The base portion 130 of the housing 110 may be a bottom case cover of the exterior casing of the mouse 100. According to various embodiments, when the cover portion 120 and the base portion 130 are assembled together, the housing 110 may define an inner cavity to house or encase internal components of the mouse 100.

According to various embodiments, the internal components of the mouse 100 may include an electronic circuit assembly, a motion detection assembly, as well as various mechanical assembly configured for operating the mouse 100. The electronic circuit assembly may include printed circuit boards, or any other suitable electronic circuit. The electronic circuit assembly may be connected to the processor-based device, such as a computer, via a cable 102. The motion detection assembly may include optical sensors, or laser sensors, or track ball mechanism, or any other electronic or mechanical components that may be configured to detect movement of the mouse 100. The motion detection assembly may further be configured to be in communication with the electronic circuit module such that the detected movement of the mouse may be transmitted to the processor-based device, which the mouse 100 may be connected to.

Further, the cover portion 120 of the housing 110 may include one or more buttons 122. The one or more buttons 122 may be configured to interact with the electronic circuit assembly of the mouse 100 for a user to provide inputs to the processor-based device, which the mouse 100 may be connected to, via clicking of the one or more buttons. The one or more buttons 122 may include a click button, or a push button, or any combination of suitable buttons. The one or more buttons 122 may be located at any desired region of the cover portion 120 as desired.

As shown in FIG. 1A and FIG. 1B, the mouse 100 may include a scroll wheel 140. According to various embodiments, the scroll wheel 140 may be configured for a user to perform scrolling of a page of an application running in the processor-based device which the mouse 100 is connected to. For example, the user may use the scroll wheel 140 to scroll through lines of texts or various graphical objects in the page of the application. As shown in FIG. 1A and FIG. 1B, the scroll wheel 140 may be mounted on the housing 110 in a manner so as to be rotatable about a first axis 141 (FIG. 4C) and so as to be partly exposed from the housing 110 to be accessible by a user of the mouse 100. Accordingly, the scroll wheel 140 may be rotatably mounted to the cover portion 120 of the housing 110 of the mouse 100. Further, a portion of the scroll wheel 140 may be exposed through a cover surface 124 of the cover portion 120 of the housing 110 of the mouse 100. Furthermore, the scroll wheel 140 may be located between two main buttons 122 at a front portion of the cover surface 124 of the cover portion 120 of the housing 110 of the mouse 100. The scroll wheel 140 may also be at least substantially perpendicular to the cover surface 124 of the cover portion 120 of the housing 110 of the mouse 100 such that the first axis 141, which is the axis of rotation of the scroll wheel 140, may be at least substantially parallel to a portion of the cover surface 124 of the cover portion 120 which the scroll wheel 140 may be mounted to. Accordingly, the user may rotate the scroll wheel 140 by stroking a finger along a circumference of the scroll wheel 140 along the cover surface 124 of the cover portion 120 of the housing 110 of the mouse 100.

According to various embodiments, the scroll wheel 140 may also be mounted to other portions or surfaces of the housing 110 of the mouse 100. For example, the scroll wheel 140 may be mounted to a side portion or a side surface of the housing 110.

Figure 2A:
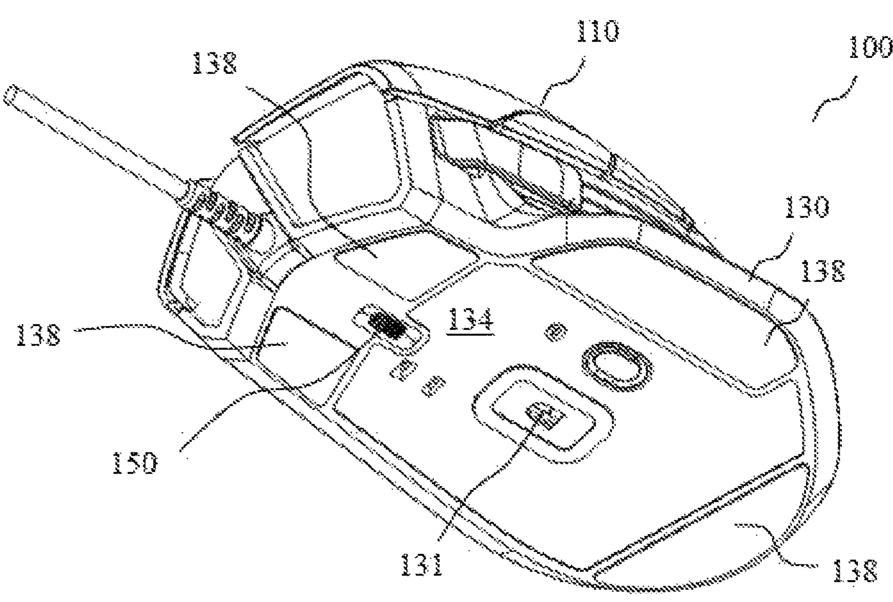
FIG. 2A shows a perspective bottom view of the mouse of FIG. 1A according to various embodiments.
Figure 2B:
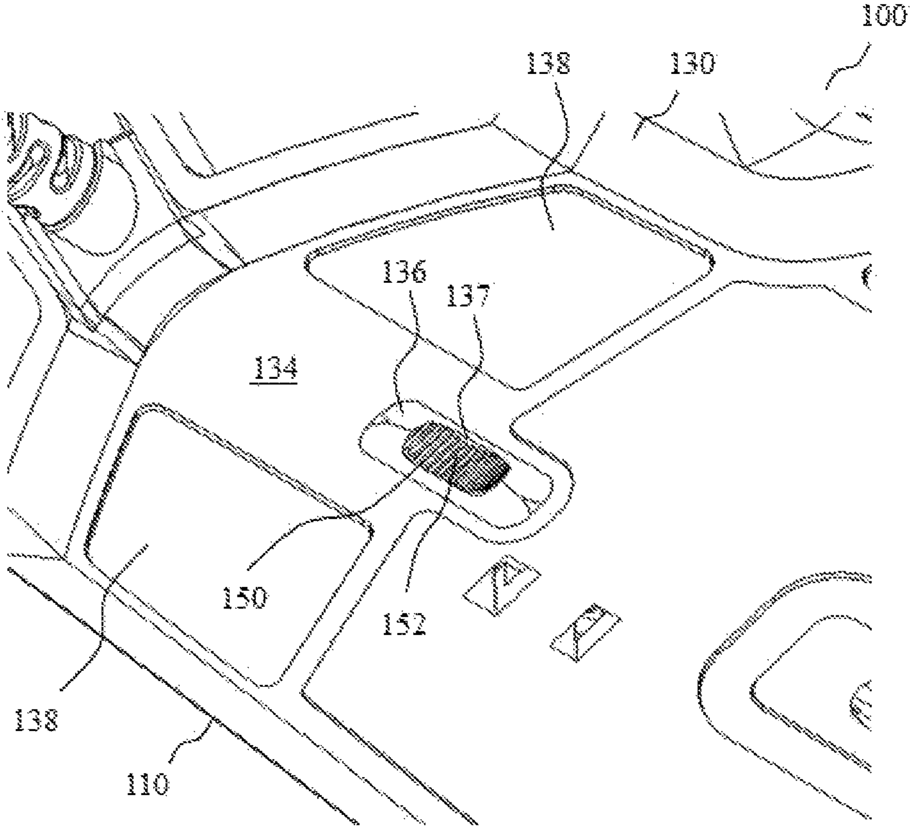
FIG. 2B shows an enlarged bottom front view of a front bottom portion of the mouse of FIG. 1A according to various embodiments.

FIG. 2A shows a perspective bottom view of the mouse 100 of FIG. 1A according to various embodiments. FIG. 2B shows an enlarged bottom front view of a front bottom portion of the mouse 100 of FIG. 1A according to various embodiments.

As shown in FIG. 2A and FIG. 2B, the housing 110 of the mouse 100 may include a base surface 134 at the base portion 130 of the housing 110. The base surface 134 may be configured to face a tracking surface on which the mouse 100 may be placed on. Accordingly, the base surface 134 of the housing 110 may be an exterior surface of a substantially flat section of the base portion 130 of the housing 110. Thus, the mouse 100 may be placed with the base surface 134 of the base portion 130 of the housing 110 substantially flat against or substantially parallel to a mouse pad, a table top, or any other suitable tracking surfaces on which the mouse may be used.

Further, the base portion 130 of the housing 110 of the mouse 100 may include a window 131. The window 131 may be an opening or a transparent portion of the base portion 130. Accordingly, the window 131 may allow the motion detection assembly of the mouse 100 to detect relative movement between the mouse 100 and the tracking surface on which the mouse 100 may be placed and moved.

As shown in FIG. 2A and FIG. 2B, the mouse 100 may also include an auxiliary wheel 150. According to various embodiments, the auxiliary wheel 150 may be configured to allow a user to gradually vary or adjust a rolling resistance of the scroll wheel 140 ranging from a free-wheeling to a predetermined maximum resistive-wheeling via rotating the auxiliary wheel 150. Accordingly, the auxiliary wheel 150 may be configured to allow a user to control an arresting force exerting on the scroll wheel 140 to achieve a finer control over the rolling resistance of the scroll wheel 140 via rotating the auxiliary wheel 150. Hence, the arresting force exerting on the scroll wheel 140 may be adjusted or varied, for example be increased or decreased, by the user via rotating the auxiliary wheel 150 to a desired arresting force having a magnitude in a range from zero arresting force to a predetermined maximum arresting force. In this manner, the auxiliary wheel 150 may also allow the user to switch from the free wheeling mode, i.e. zero arresting force, to the resistive-wheeling mode (or adjustable resistive-wheeling mode).

Referring to FIG. 2A and FIG. 2B, the auxiliary wheel 150 may be mounted on the housing 110 in a manner so as to be rotatable about a second axis 151 (FIG. 4C) and so as to be partly exposed from the housing 110 to be accessible by the user. Accordingly, the auxiliary wheel 150 may be rotatably mounted to the base portion 130 of the housing 110 of the mouse 100. Further, a portion 152 of the auxiliary wheel 150 may be exposed through the base surface 134 of the base portion 120 of the housing 110 of the mouse 100. The auxiliary wheel 150 may also be at least substantially perpendicular to the base surface 134 of the base portion 130 of the housing 110 of the mouse 100 such that the second axis 151, which is the axis of rotation for the auxiliary wheel 150, may be at least substantially parallel to the base surface 134 of the base portion of the housing 110 of the mouse 100.

Further, the base surface 134 of the base portion 130 of the housing 110 of the mouse 100 may include a recess 136 and an opening 137 in the recess 136. Accordingly, the portion 152 of the auxiliary wheel 150 may be exposed or bared through the opening 137 of the base surface 134 of the housing 110 and a substantial portion of the auxiliary wheel 150 may remain within the cavity enclosed by the housing 110 of the mouse 100.

According to various embodiments, the portion 152 of the auxiliary wheel 150 may protrude or project from the opening 137 into the recess 136 without jutting out of the base surface 134. Accordingly, the user may press a finger into the recess 136 to contact the portion 152 of the auxiliary wheel 150 so as to rotate the auxiliary wheel 150 to adjust the scrolling mode of the scroll wheel 140 and/or to control the rolling resistance/arresting force of the scroll wheel 140.

According to various other embodiments, the portion 152 of the auxiliary wheel 150 of the mouse 100 may protrude or project from the opening 137 through the recess 136 and jut out from the base surface 134. Accordingly, an exposed portion 152 of the auxiliary wheel 150 may protrude from the housing 110. Hence, the user may press the mouse 100 against the tracking surface such that the portion 152 of the auxiliary wheel 150 may contact the tracking surface so as to move the mouse 100 to rotate the auxiliary wheel 150 to adjust the scrolling mode of the scroll wheel 140 and/or to control the rolling resistance/arresting force of the scroll wheel 140.

According to various other embodiments, the auxiliary wheel 150 may also be mounted to other portions or surfaces of the housing 110 of the mouse 100. For example, the auxiliary wheel 150 may be mounted to a side portion or a side surface of the housing 110.

Referring back to FIG. 2A and FIG. 2B, the mouse 100 may include one or more (e.g., a plurality of) mouse foot protrusions 138 projecting from the base surface 134 of the base portion 130 of the housing 110. The one or more mouse foot protrusions 138 may be configured for directly contacting the tracking surface on which the mouse 100 may be placed and moved, and the one or more mouse foot protrusions 138 may be configured to facilitate gliding or sliding of the mouse 100 over the tracking surface. According to various embodiments, the one or more mouse foot protrusions 138 may be made of polytetrafluoroethylene.

According to various embodiments, the one or more mouse foot protrusions 138 may be attached to the base surface 134 of the housing 110 via adhesive or any other suitable fastening means. According to various other embodiments, the one or more mouse foot protrusions 138 may be integrally molded with the base portion 130 and forming a portion of the base portion 130 of the housing 110.

According to various embodiments, the one or more mouse foot protrusions 138 may be configured to be compressible and a height of the one or more mouse foot protrusions may be greater than a protrusion height of the portion 152 of the auxiliary wheel 150 protruding and measuring from the base surface 134 of the base portion 130 of the housing 110 of the mouse 100. Accordingly, during normal use of the mouse 100, the one or more mouse foot protrusions 138 may offset the base surface 134 of the base portion 130 of the housing 110 from the tracking surface such that the portion 152 of the auxiliary wheel 150 protruding from the base surface 134 of the base portion 130 of the housing 110 may not contact the tracking surface. Further, when the mouse 100 is pressed against the tracking surface, the one or more mouse foot protrusions 138 may be compressed such that the portion 152 of the auxiliary wheel 150 may then come into contact with the tracking surface. Accordingly, the auxiliary wheel 150 may then be rotated via pressing and moving the mouse 100 across the tracking surface for adjusting the scrolling mode of the scroll wheel 140 or controlling the rolling resistance/arresting force of the scroll wheel 140.

As shown in FIG. 2A and FIG. 2B, the mouse 100 may include four mouse foot protrusions 138 projecting from the base surface 134. According to various embodiments, the mouse 100 may include one, or two, or three, or four, or five, or six, or any number of mouse foot protrusions 138. Further, the one or more mouse foot protrusions 138 may be of any suitable shape, for example, a quadrilateral shape, or an oval shape, or an elliptical shape, or a crescent shape, or an annular shape, or any other suitable shapes.

Figure 3A:
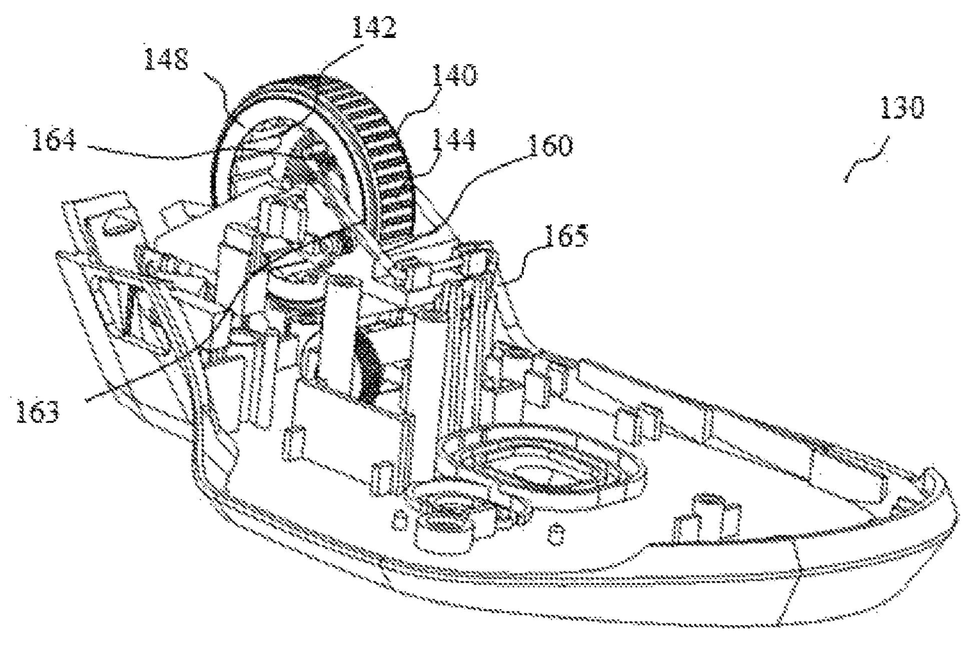
FIG. 3A shows a perspective view of a base portion of a housing of the mouse of FIG. 1A according to various embodiments.
Figure 3B:
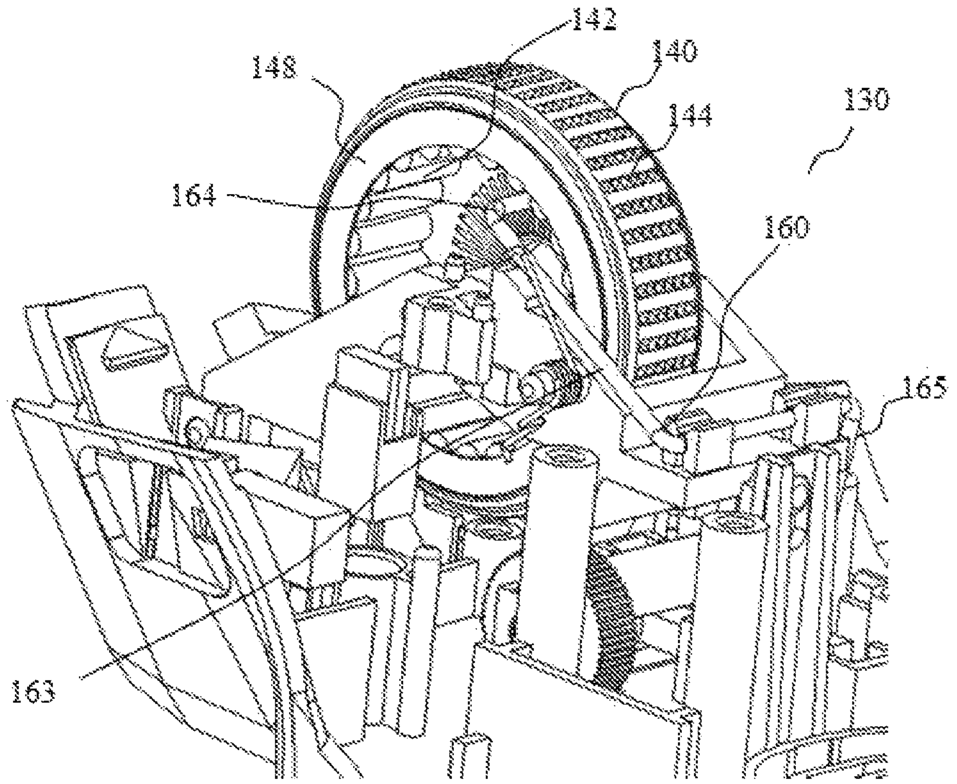
FIG. 3B shows an enlarged view of a front portion of the base portion of the housing of FIG. 3A according to various embodiments.
Figure 3C:
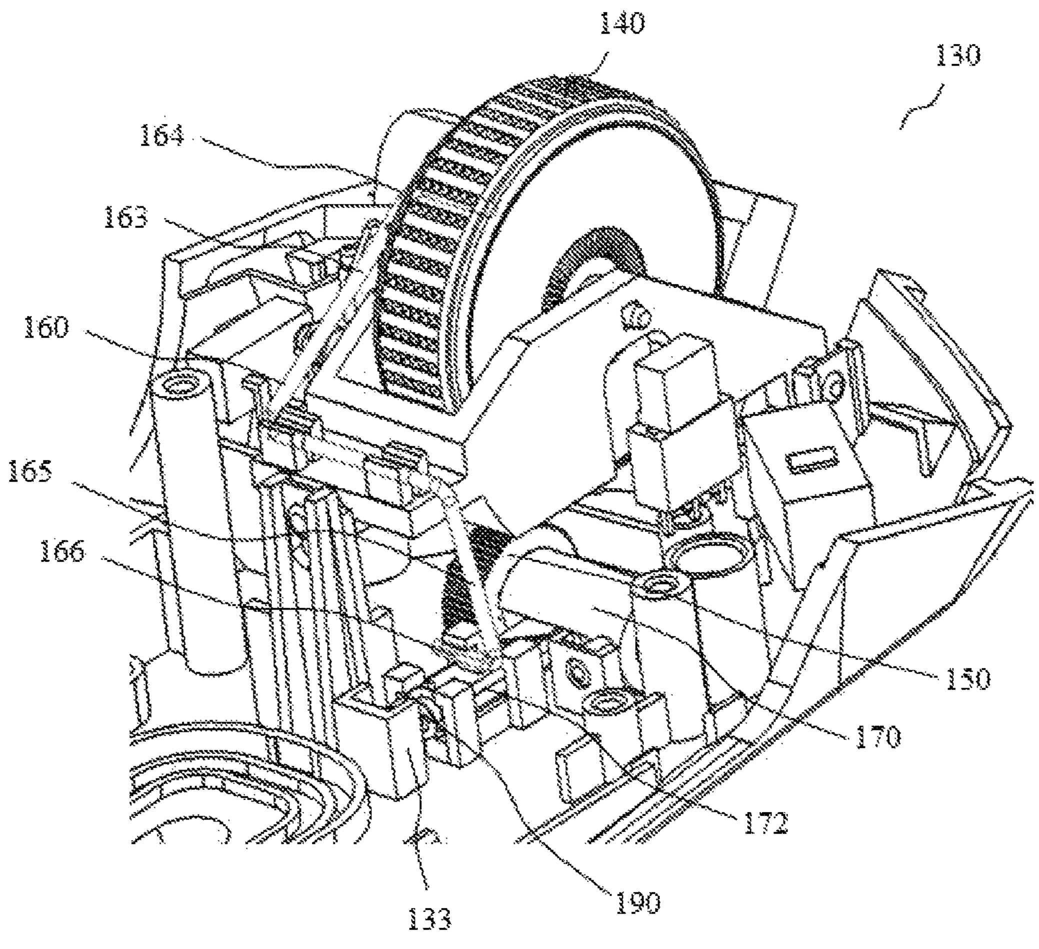
FIG. 3C shows another enlarged view of a front portion of the base portion of the housing of FIG. 3A according to various embodiments.

FIG. 3A shows a perspective view of the base portion 130 of the housing 110 of the mouse 100 according to various embodiments. FIG. 3B shows an enlarged view of a front portion of the base portion 130 of the housing 110 of the mouse 100 according to various embodiments. FIG. 3C shows another enlarged view of the front portion of the base portion 130 of the housing 110 of the mouse 100 according to various embodiments.

As shown in FIG. 3A and FIG. 3B, the scroll wheel 140 of the mouse 100 may include an arresting surface 142 which extends circumferentially about the first axis 141. The scroll wheel 140 of the mouse 100 may include a ring portion 148. The arresting surface 142 may be an inner cylindrical surface of the ring portion 148 of the scroll wheel 140. Further, the ring portion 148 of the scroll wheel 140 may include an outer cylindrical surface 144. The outer cylindrical surface 144 of the scroll wheel 140 may be textured for gripping so as to facilitate rotating of the scroll wheel 140 by the user. According to various embodiments, a center of the ring portion 148 may coincide with the first axis 141.

As further shown in FIG. 3A to FIG. 3C, the mouse 100 may further include a lever 160 which may be provided with a first lever arm 163 and a second lever arm 165. The lever 160 may be mounted on the housing 110. According to various embodiments, the lever 160 may be mounted to a wheel cradle which may be mounted to a base portion 130 of the housing 110. According to various other embodiments, the lever 160 may be mounted to a wheel cradle which may be integrally molded with the base portion 130 of the housing 110 and which may form an integral part of the base portion 130 of the housing 110.

According to various embodiments, the lever 160 may be mounted on the housing 110 so as to be pivotable about a pivot axis 161 (FIG. 4C) which extends between the first lever arm 163 and the second lever arm 165. Accordingly, the lever 160 may be mounted to the housing 110 such that the pivot axis 161 of the lever 160 extends at least substantially perpendicular to the first lever arm 163 and the second lever arm 165 of the lever 160. Hence, the lever 160 may be pivotable about the pivot axis 161 with the first lever arm 163 on one side of the pivot axis 161 and the second lever arm 165 on the other side of the pivot axis 161. Further, the lever 160 may be mounted to the base portion 130 of the housing 110 in a manner so as to be housed within the cavity enclosed by the housing 110. The lever 160 may also be pivotably mounted to the base portion 130 of the housing 110 between the first lever arm 163 and the second lever arm 165. Accordingly, the lever 160 may be pivotable relative to the base portion 130 of the housing 110 about the pivot axis 161.

According to various embodiments, the pivot axis 161 of the lever 160, the first axis 141 (which is the rotational axis of the scroll wheel 140) and the second axis 151 (which is the rotational axis of the auxiliary wheel 150) may be at least substantially parallel to each other.

According to various embodiments, a first free end portion 164 of the first lever arm 163 of the lever 160 may be configured to engage the arresting surface 142 of the scroll wheel 140 with an engagement force to arrest a rotation of the scroll wheel 140 with a corresponding arresting force. Accordingly, the first free end portion 164 of the first lever arm 163 of the lever 160 may contact or interact with the scroll wheel 140 so as to slow down or retard or resist or suppress a rotation of the scroll wheel 140. Hence, the scroll wheel 140 may be in the resistive-wheeling mode when the first free end portion 164 of the first lever arm 163 of the lever 160 is engaged to the arresting surface 142 of the scroll wheel 140. On the other hand, in case the first free end portion 164 of the first lever arm 163 is in a non-engagement condition, in which it does not engage the arresting surface 142, the scroll wheel 140 is then in the free-wheeling mode. According to various embodiments, the first free end portion 164 of the first lever arm 163 of the lever 160 may engage the scroll wheel 140 via a ratchet arrangement or a frictional contact.

As shown in FIG. 3C, the mouse 100 may further include a motion converter 170 or a rotary to linear motion converter. The motion converter 170 may include a rotary input axis 171 and a linear output axis 173. The motion converter 170 may be connected to the auxiliary wheel 150. The motion converter 170 may be disposed within the cavity enclosed by the housing 110. According to various embodiments, the rotary input axis 171 of the motion converter 170 and the pivot axis 161 of the lever 160 may be substantially parallel to each other. According to various embodiments, the motion converter 170 may be configured to convert a rotary input motion of the auxiliary wheel 150 about the rotary input axis 171 into a linear output motion along the linear output axis 172. The motion converter 170 may include an elongated member 172. Accordingly, rotating the auxiliary wheel 150 may cause the motion converter 170 to convert the rotary input motion into the linear output motion so as to generate a linear motion of the elongated member 172 of the motion converter 170. According to various embodiments, the motion converter 170 may include a rack and pinion mechanism, or a nut and screw mechanism, or a crank and slider mechanism, or any other suitable mechanism.

According to various embodiments, the motion converter 170 may also be connected to or in engagement with a second free end portion 166 of the second lever arm 165 of the lever 160. Accordingly, the elongated member 172 of the motion converter 170 may be connected to or in engagement with the second free end portion 166 of the second lever arm 165 of the lever 160. Hence, the motion converter 170 may apply a linear force at the second free end portion 166 of the second lever arm 165 of the lever 160 via the linear motion of the elongated member 172 of the motion converter 170. In other words, the linear output motion of the motion converter 170 may move the elongated member 172 linearly for moving the second free end portion 166 of the second lever arm 165 of the lever 160.

According to various embodiments, the motion converter 170 may be configured to apply said linear output motion to the second free end portion 166 of the second lever arm 165 so as to pivot the lever 160 about the pivot axis 161 to correspondingly adjust the engagement force exerted by the first free end portion 164 of the first lever arm 163 of the lever 160 on the arresting surface 142 of the scroll wheel 140, whereby the corresponding arresting force applied to the scroll wheel 140 may be correspondingly adjustable by the rotation of the auxiliary wheel 150. Accordingly, the linear output motion applied on the second free end portion 166 of the second lever arm 165 of the lever 160 may generate or produce a moment to pivot the lever 160 about the pivot axis 161 such that the engagement force exerted by the first free end portion 164 of the first lever arm 163 of the lever 160 on the arresting surface 142 of the scroll wheel 140 may be varied over a range depending on a degree of the linear output motion applied.

According to various embodiments, the linear output motion applied on the second free end portion 166 of the second lever arm 165 of the lever 160 may pivot the lever 160 about the pivot axis 161 such that the first free end portion 164 of the first lever arm 163 of the lever 160 may be fully disengaged from the arresting surface 142 of the scroll wheel 140, whereby no engagement force is exerted by the first free end portion 164 of the first lever arm 163 of the lever 160 on the arresting surface 142 of the scroll wheel 140.

Accordingly, the scroll wheel 140 may be in the free-wheeling mode when the first end portion 164 of the first lever arm 163 of the lever 160 is fully disengaged from the arresting surface 142 of the scroll wheel 140. On the other hand, the scroll wheel 140 may be in the adjustable resistive-wheeling mode whenever the first free end portion 164 of the first lever arm 163 of the lever 160 is exerting an engagement force, which may be adjusted or varied, on the arresting surface 142 of the scroll wheel 140. Thus, according to various embodiments, the scroll wheel 140 may be adjusted between different modes of scrolling by controlling the degree of linear motion applied at the second free end portion 166 of the second lever arm 165 of the lever 160 via controlled rotation of the auxiliary wheel 150. The rolling resistance/arresting force of the scroll wheel 140 may also be adjusted, for example increased or decreased, by controlling the degree of linear motion applied at the second free end portion 166 of the second lever arm 165 of the lever 160 via controlled rotation of the auxiliary wheel 150.

Thus, the motion converter 170 may be configured to convert the rotary input motion about the rotary input axis 171 into the linear output motion along the linear output axis 173 for moving the second free end portion 166 of the second lever arm 165 so as to pivot the lever 160 about the pivot axis 161 for engaging or disengaging the first free end portion 164 of the first lever arm 163 and the arresting surface 142 of the scroll wheel 140 to interchange the scroll wheel 140 between the free-wheeling mode and the resistive-wheeling mode.

FIG. 4A to FIG. 4D show various views of an assembly 101 of the scroll wheel 140 and the auxiliary wheel 150 of the mouse 100 according to various embodiments.

Figure 4A:
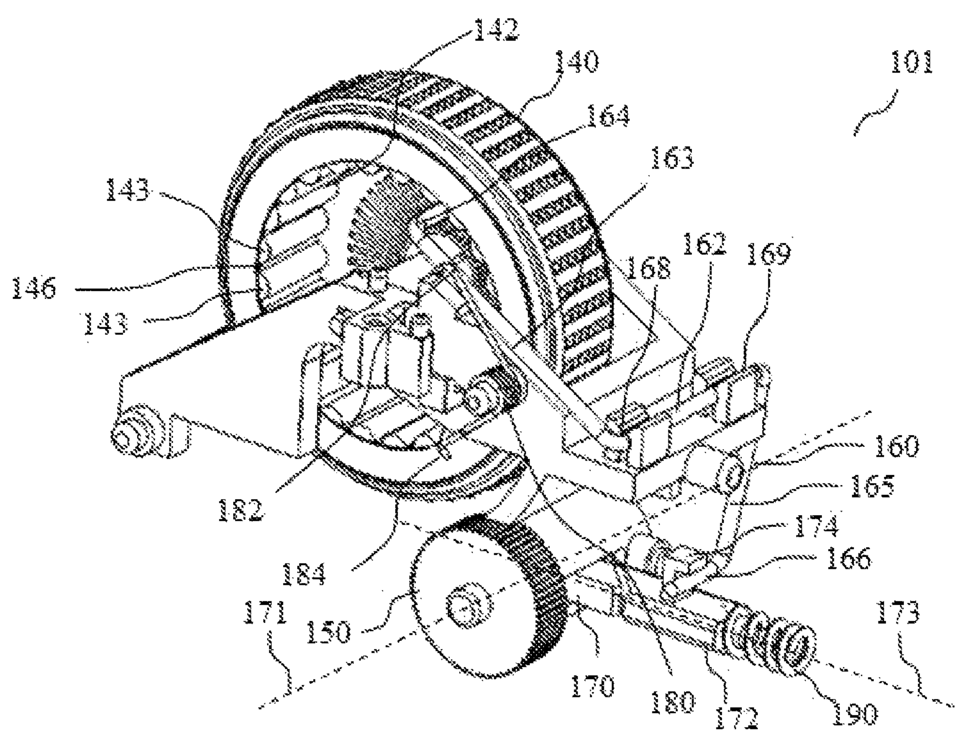
FIG. 4A to FIG. 4D show various views of an assembly of a scroll wheel and an auxiliary wheel of the mouse of FIG. 2A according to various embodiments.
Figure 4B:
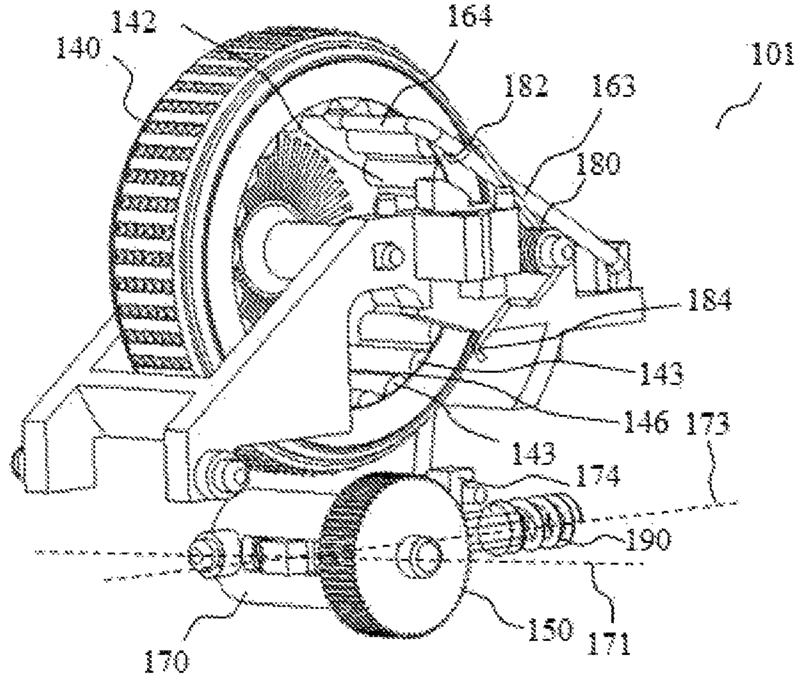
Figure 4C:
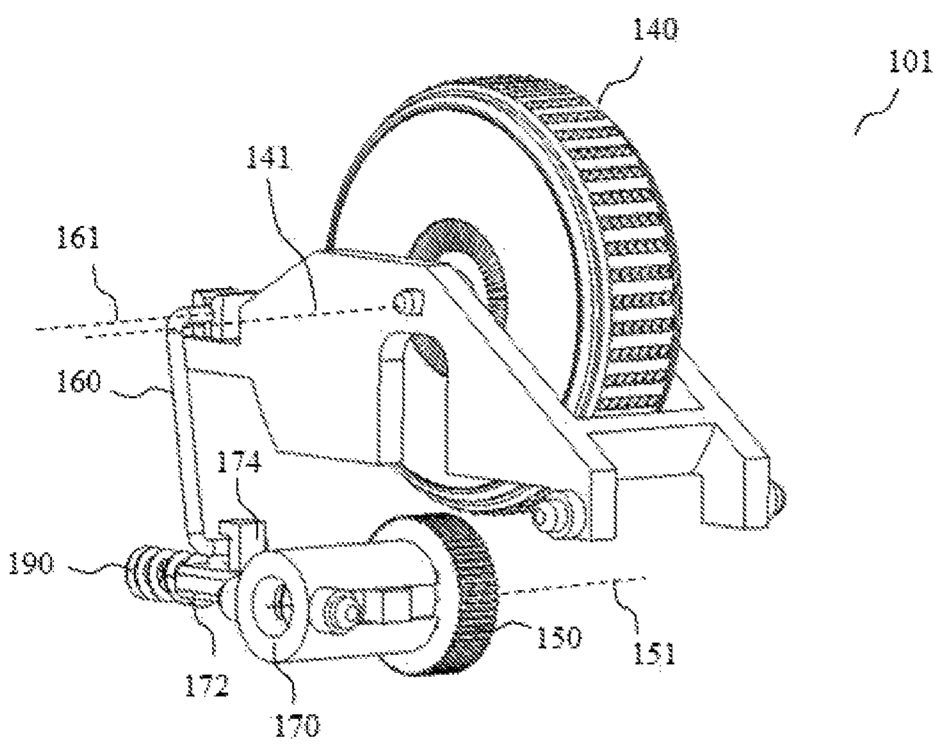
Figure 4D:
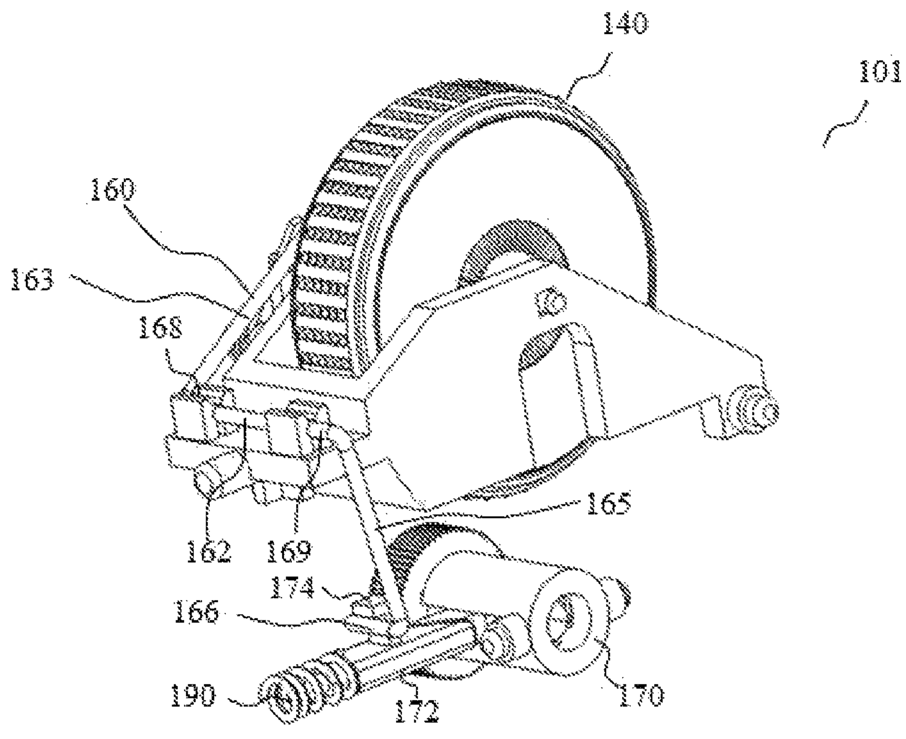
Figure 5A:
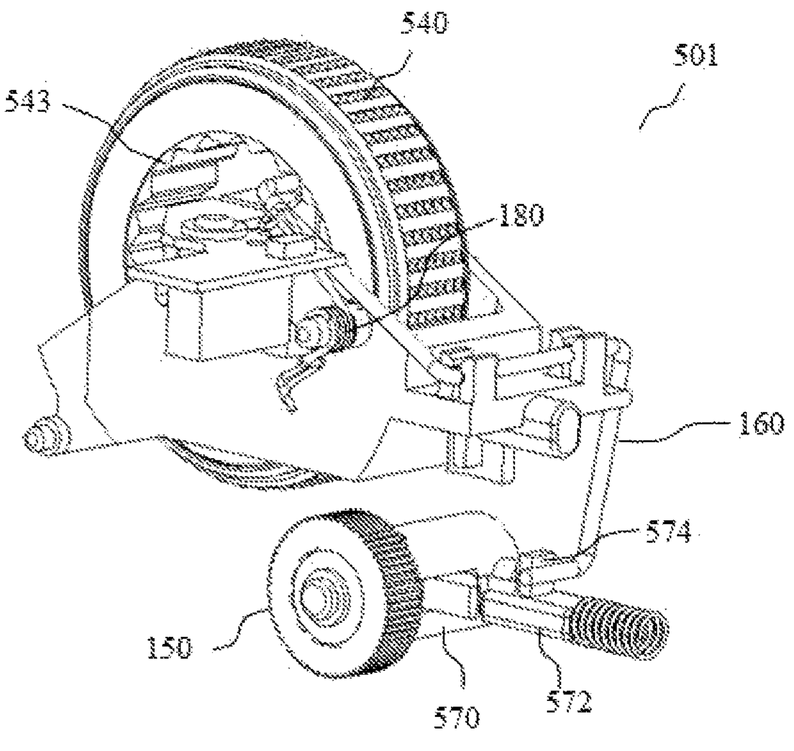
FIG. 5A and FIG. 5B show various views of an assembly of a scroll wheel and an auxiliary wheel of a mouse according to various embodiments.
Figure 5B:
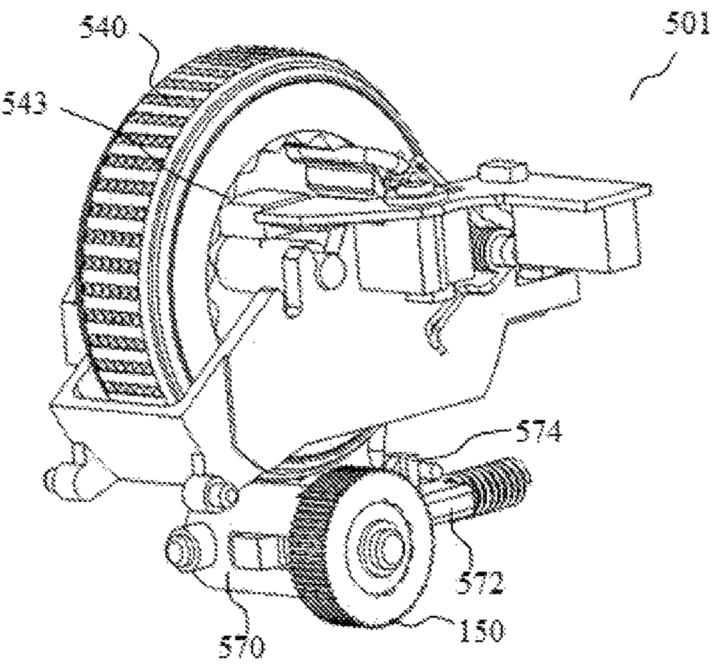

As shown in FIG. 4A and FIG. 4B, the arresting surface 142 of the scroll wheel 140 may include a plurality of serrations 143. As shown, the plurality of serrations 143 may be rounded or curved. According to various embodiments, the plurality of serrations 143 may be pointed or V-shaped or tapered, for example as shown in FIG. 5A and FIG. 5B. Referring back to FIG. 4A and FIG. 4B, in between each adjacent pair of serrations may be a notch 146. Further, the first free end portion 164 of the first lever arm 163 of the lever 160 may include a finger or a rod-shaped extension. According to various embodiments, the finger may be configured to fit into a respective notch 146 between respective two adjacent serrations of the plurality of serrations 143 of the arresting surface 142 of the scroll wheel 140. Accordingly, the first free end portion 164 of the first lever arm 163 of the lever 160 may engage the scroll wheel 140 via interlocking the finger of the first free end portion 164 of the first lever arm 163 of the lever 160 with the notch 146 of the arresting surface 142 of the scroll wheel 140. As shown in FIG. 4A and FIG. 4D, the lever 160 may include an elongated connection section 162 which may form a pivot axle defining the pivot axis 161 of the lever 160. The first lever arm 163 and the second lever arm 165 may be fixedly connected to each other via the elongated connection section 162. Further, the pivot axle formed by the elongated connection section 162 may extend at least substantially perpendicular to a respective longitudinal extension direction of both the first lever arm 163 and the second lever arm 165. Furthermore, the elongated connection section 162 may include a first section end 168 and a second section end 169. The first section end 168 may be connected to a first connection end, opposite to the first free end portion 164, of the first lever arm 163. The second section end 169 may be connected to a second connection end, opposite to the second free end portion 166, of the second lever arm 165.

Referring to FIG. 4A and FIG. 4B, the mouse 100 may further include a biasing mechanism 180. The biasing mechanism 180 may be connected to the first lever arm 163 of the lever 160 to apply a biasing force on the first free end portion 164 of the first lever arm 163 so as to bias the first free end portion 164 of the first lever arm 163 towards the arresting surface 142 of the scroll wheel 140 to exert the engagement force by the first free end portion 164 of the first lever arm 163 on the arresting surface 142 of the scroll wheel 140. Accordingly, the biasing mechanism 180 may bias the first free end portion 164 of the first lever arm 163 of the lever 160 against the arresting surface 142 of the scroll wheel 140 to exert the engagement force on the arresting surface 142 of the scroll wheel 140 so as to arrest a rotation of the scroll wheel 140. Accordingly, a first end 182 of the biasing mechanism 180 may be connected to the first lever arm 163 of the lever 160 and a second end 184 of the biasing mechanism 180 may be fixed to the base portion 130 of the housing 110. According to various embodiments, the first end 182 of the biasing mechanism 180 may bias the first lever arm 163 of the lever 160 away from the second end 184 of the biasing mechanism 180 to push the first free end portion 164 of the first lever arm 163 of the lever 160 against the arresting surface 142 of the scroll wheel 140 so as to exert the engagement force on the arresting surface 142 of the scroll wheel 140. According to various embodiments, the biasing mechanism 180 may include a torsion spring.

According to various embodiments, the motion converter 170 may be configured to apply the linear output motion to the second free end portion 166 of the second lever arm 165 of the lever 160 to pivot the lever 160 about the pivot axis 161 so as to correspondingly counter the biasing force exerted by the biasing mechanism 180 on the first free end portion 164 of the first lever arm 163 of the lever 160 to correspondingly adjust the engagement force exerted by the first free end portion 164 of the first lever arm 163 of the lever 160 on the arresting surface 142 of the scroll wheel 140 so as to arrest a rotation of the scroll wheel 140. Accordingly, the rolling resistance/arresting force of the scroll wheel 140 due to the biasing force of the biasing mechanism 180 may be adjusted in a controlled manner by controlling the degree of linear output motion applied to the second free end portion 166 of second lever arm 165 of the lever 160 via controlled rotation of the auxiliary wheel 150.

According to various embodiments, the linear output motion applied on the second free end portion 166 of the second lever arm 165 of the lever 160 may pivot the lever 160 about the pivot axis 161 such that the first free end portion 164 of the first lever arm 163 of the lever 160 may be fully disengaged from the arresting surface 142 of the scroll wheel 140, whereby the biasing force of the biasing mechanism 180 may no longer cause the first free end portion 164 of the first lever arm 163 of the lever 160 to exert an engagement force on the arresting surface 142 of the scroll wheel 140. Hence, the motion converter 170 may move the second free end portion 166 of the second lever arm 165 of the lever 160 to pivot the lever 160 about the pivot axis 161 so as to correspondingly counter the biasing force exerted by the biasing mechanism 180 on the first free end portion 164 of the first lever arm 163 of the lever 160 for disengaging from the arresting surface 142 of the scroll wheel 140 to change the scroll wheel 140 into the free-wheeling mode. Accordingly, the rolling resistance of the scroll wheel 140 may be changed between the free-wheeling mode and the predetermined maximum resistive-wheeling mode by controlling the degree of linear output motion applied to the second free end portion 166 of the second lever arm 165 of the lever 160 by the motion converter 170 via controlled rotation of the auxiliary wheel 150.

According to various embodiments, the elongated member 172 of the motion converter 170 may be movable linearly along a longitudinal axis of the elongated member 172. The elongated member 172 may be connected to or in engagement with the second free end portion 166 of the second lever arm 165 of the lever 160 so as to apply the linear motion to the second free end portion 166 of the second lever arm 165 of the lever 160. Hence, the elongated member 172 may move the second free end portion 166 of the second lever arm 165 of the lever 160. Accordingly, the motion converter 170 may convert a rotation of the auxiliary wheel 150, which is provided to the motion converter 170 as the rotary input motion, into the linear output motion to move the elongated member 172 linearly in a longitudinal direction for moving the second free end portion 166 of the second lever arm 165 of the lever 160.

According to various embodiments, the elongated member 172 may include a projection 174 configured to engage or catch or contact or interlock or receive the second free end portion 166 of the lever 160 such that the linear motion of the elongated member 172 may be transferred or applied or transmitted or passed on to the second free end portion 166 of the lever 160 for pivoting the lever 160 about the pivot axis 161. As shown in FIG. 4A to FIG. 4D, the projection 174 may be in the form of a hook or an angled structure. According to various embodiments, the projection 174 may also be in the form of a flat wall or a bar or a rod, which may be at least substantially perpendicular to the elongated member 172, as shown in FIG. 5A or FIG. 5B. Accordingly, the projection 174 may be protruding from the elongated member 172 in a protrusion direction perpendicular to the longitudinal axis of the elongated member 172.

According to various embodiments, when the motion converter 170 includes a nut and screw shaft mechanism, the motion converter 170 may be a nut and screw shaft motion converter. Accordingly, the elongated member 172 of the motion converter 170 may be connected to or in contact with the screw shaft, and the nut of the motion converter 170 may be connected to or in engagement with the auxiliary wheel 150. Hence, when the motion converter 170 includes a nut and screw shaft mechanism, the motion converter 170 may be a one-way or a single-way mechanism whereby rotating the auxiliary wheel 150 may rotate the nut to provide the rotary input motion which may be converted to the linear output motion to move the screw shaft linearly so as to convert a rotation of the auxiliary wheel 150 into a linear motion of the elongated member 172. On the other hand, the motion converter 170 may not allow the elongated member 172 to be actuated linearly to cause a rotation of the auxiliary wheel 150. Further, the nut and screw shaft mechanism may allow the elongated member 172 to be held in place whenever the rotation of the auxiliary wheel 150 is stopped. Hence, the elongated member 172 may be moved linearly and may be stopped at any desired position.

According to various other embodiments, when the motion converter 170 includes a rack and pinion mechanism, the motion converter 170 may be a rack and pinion motion converter. Accordingly, the elongated member 172 of the motion converter 170 may be connected to or in contact with the rack of the motion converter 170, and the pinion of the motion converter 170 of the motion converter 170 may be connected to or in engagement with the auxiliary wheel 150. Hence, rotating the auxiliary wheel 150 may impart the rotary input motion to the pinion which may be converted to the linear output motion of the rack of the motion converter 170 for moving the elongated member 172. According to various other embodiments, when the motion converter 170 includes a crank and slider mechanism, the motion converter 170 may be a crank and slider motion converter. Accordingly, the elongated member 172 of the motion converter 170 may be connected to or in contact with the slider, and the crank of the motion converter 170 may be connected to or in engagement with the auxiliary wheel 150. Hence, rotating the auxiliary wheel 150 may impart the rotary input motion to the crank which may be converted to the linear output motion of the slider of the motion converter 170 for moving the elongated member 172.

Referring to FIG. 4A to FIG. 4D, the mouse 100 may further include an auxiliary biasing mechanism 190. The auxiliary biasing mechanism 190 may be connected to the elongated member 172 of the motion converter 170. Accordingly, a first end of the auxiliary biasing mechanism 190 may be connected to the elongated member 172 of the motion converter 170 and a second end of the auxiliary biasing mechanism 190 may be fixed to a holder 133 (see FIG. 3C) on the base portion 130 of the housing 110. According to various embodiments, the auxiliary biasing mechanism 190 may include a coil spring. Further, according to various embodiments, the auxiliary biasing mechanism 190 may be configured to keep or bias the elongated member 172 to be in firm contact or connection with the mechanism of the motion converter 170, regardless of the position of the elongated member 172, such that the elongated member 172 may be sensitive or responsive to a rotation of the auxiliary wheel 150 so as to readily or immediately move the elongated member 172 linearly as a result of the rotation of the auxiliary wheel 150 to cause the lever 160 to pivot for adjusting the arresting force on the scroll wheel 140.

FIG. 5A and FIG. 5B show various views of an assembly 501 of a scroll wheel 540 and an auxiliary wheel 150 of a mouse according to various embodiments. The assembly 501 of FIG. 5A and FIG. 5B may differ from the assembly 101 of FIG. 4A to FIG. 4D in that the plurality of serrations 543 of the scroll wheel 540 of the assembly 501 may be sharp and pointed, whereas the plurality of serrations 143 of the scroll wheel 140 of assembly 101 may be rounded and curved. Further, the assembly 501 of FIG. 5A and FIG. 5B may also differ from the assembly 101 of FIG. 4A to FIG. 4D in that the projection 574 of the elongated member 572 of the motion converter 570 of the assembly 501 may be a hook or angled structure, whereas the projection 174 of the elongated member 172 of the motion converter 170 of the assembly 101 may be a vertical flat wall or a vertical bar. The other components of the assembly 501, such as the lever 160, the auxiliary wheel 150, and the biasing mechanism 180, may be similar to those of the assembly 101.

According to various embodiments, the mouse 100 may include an electric motor coupled to the auxiliary wheel 150. Accordingly, the auxiliary wheel 150 may be rotated by the electric motor. Hence, in addition to being manually rotatable by the user via the user's finger stroking the auxiliary wheel 150 to provide the rotary input motion to the motion converter 170, 570 for conversion into the linear output motion to move the second free end portion 166 of the second lever arm 165 so as to pivot the lever 160 about the pivot axis 161 for engaging or disengaging the first free end portion 164 of the first lever arm 163 and the arresting surface 142 of the scroll wheel 140 to interchange the scroll wheel 140 between the free-wheeling mode and the resistive-wheeling mode, the auxiliary wheel 150 may also be rotated via the electric motor to provide the rotary input motion. Thus, the user may activate the electric motor to switch the scroll wheel 140 between the free-wheeling mode and the resistive-wheeling mode, either by a software application (e.g. via an external processor-based device) or by a switch on the mouse.

FIG. 6A to FIG. 6D show various views of another assembly 601 of the scroll wheel 140 and a motion converter 670 for the mouse 100 according to various embodiments. According to various embodiments, instead of the auxiliary wheel 150, an electric motor 653 may be coupled to the motion converter 670 to provide the rotary input motion about the rotary input axis 671 for converting into the linear output motion along the linear output axis 673 to move the second free end portion 166 of the second lever arm 165 so as to pivot the lever 160 about the pivot axis 161 for engaging or disengaging the first free end portion 164 of the first lever arm 163 and the arresting surface 142 of the scroll wheel 140. Accordingly, the mouse 100 may include the electric motor 653. Hence, in this configuration without the auxiliary wheel 150, the user may switch the scroll wheel 140 between the free-wheeling mode and the resistive-wheeling mode, either by a software application (e.g. via a processor-based device) or by a switch on the mouse 100.

According to various embodiments, the electric motor 653 may be disposed within the cavity enclosed by the housing 110. According to various embodiments, as shown in FIG. 6A to FIG. 6D, the scroll wheel 140 may be mounted on a scroll-wheel-bracket 645 which may, in turn, be mounted to the base portion 130 of the housing 110 in a manner such that the portion of the scroll wheel 140 may be partly exposed through the cover surface 124 of the cover portion 120 of the housing 110 of the mouse 100 while the remaining portion of the scroll wheel 140 and the scroll-wheel-bracket 645 may be housed within the cavity enclosed by the housing 110.

According to various embodiments, the lever 160 may be integrated into or mounted to the scroll-wheel-bracket 645. Accordingly, the lever 160 may also be mounted to the base portion 130 of the housing 110, via the scroll-wheel-bracket 645, between the first lever arm 163 and the second lever arm 165. The lever 160 may be pivotably mounted to the scroll-wheel-bracket 645. Accordingly, the lever 160 may be pivotable relative to the base portion 130 of the housing 110, as well as the scroll-wheel-bracket 645, about the pivot axis 161.

According to various embodiments, the motion converter 670 may be integrated into or mounted to the scroll-wheel-bracket 645, which is mounted to the base portion 130 of the housing 110. According to various embodiments, the motion converter 670 and the lever 160 may be disposed or arranged such that the rotary input axis 671 of the motion converter 670 and the pivot axis 161 of the lever 160 may be substantially parallel to each other.

According to various embodiments, the electric motor 653 may be disposed or mounted to the scroll-wheel-bracket 645, which is mounted to the base portion 130 of the housing 110. According to various embodiments, the electric motor 653 may be coupled to the motion converter 670. According to various embodiments, the electric motor 653, the motion converter 670, and the lever 160 may be disposed or arranged such that the rotary input axis 671 of the motion converter 670, a rotational driving axis 655 of the electric motor 653, and the pivot axis 161 of the lever 160 may be substantially parallel to each other. According to various embodiments, the motion converter 670 may convert the rotary input motion about the rotary input axis 671, which is transmitted from the electric motor 653, into the linear output motion along the linear output axis 672. Accordingly, activating the electric motor 653 may cause the motion converter 670 to convert the rotary input motion into the linear output motion so as to generate the linear motion of the elongated member 672 of the motion converter 670. According to various embodiments, the motion converter 670 may include a rack and pinion mechanism, or a nut and screw mechanism, or a crank and slider mechanism, or any other suitable mechanism.

According to various embodiments, the motion converter 670 may be in engagement with the second free end portion 166 of the second lever arm 165 of the lever 160. Accordingly, the elongated member 672 of the motion converter 670 may be in engagement with the second free end portion 166 of the second lever arm 165 of the lever 160. Hence, the motion converter 670 may move the second free end portion 166 of the second lever arm 165 of the lever 160 via the linear motion of the elongated member 672 of the motion converter 670. In other words, the linear output motion of the motion converter 670 may move the elongated member 672 linearly for moving the second free end portion 166 of the second lever arm 165 of the lever 160.

According to various embodiments, the motion converter 670 may move the second free end portion 166 of the second lever arm 165 so as to pivot the lever 160 about the pivot axis 161 to correspondingly move the first free end portion 164 of the first lever arm 163 of the lever 160 for engaging or disengaging the arresting surface 142 of the scroll wheel 140. Accordingly, the scroll wheel 140 may be in the freewheeling mode when the first end portion 164 of the first lever arm 163 of the lever 160 is fully disengaged from the arresting surface 142 of the scroll wheel 140. On the other hand, the scroll wheel 140 may be in the resistive-wheeling mode whenever the first free end portion 164 of the first lever arm 163 of the lever 160 is engaged to the arresting surface 142 of the scroll wheel 140. Thus, according to various embodiments, the scroll wheel 140 may be switched between different modes of scrolling by controlling the motion converter 670 to move the second free end portion 166 of the second lever arm 165 of the lever 160 via controlled rotation of the electric motor 645.

Thus, the motion converter 670 may be configured to convert the rotary input motion about the rotary input axis 671 into the linear output motion along the linear output axis 673 for moving the second free end portion 166 of the second lever arm 165 so as to pivot the lever 160 about the pivot axis 161 for engaging or disengaging the first free end portion 164 of the first lever arm 163 and the arresting surface 142 of the scroll wheel 140 to interchange the scroll wheel 140 between the free-wheeling mode and the resistive-wheeling mode.

According to various embodiments, the elongated member 672 of the motion converter 670 may be movable linearly along the longitudinal axis of the elongated member 672. The elongated member 672 may be in engagement with the second free end portion 166 of the second lever arm 165 of the lever 160 so as to apply the linear motion to the second free end portion 166 of the second lever arm 165 of the lever 160. Hence, the elongated member 672 may move the second free end portion 166 of the second lever arm 165 of the lever 160. Accordingly, the motion converter 670 may convert the rotary input motion provided to the motion converter 670 from the electric motor 653 into the linear output motion to move the elongated member 672 linearly along the longitudinal axis of the elongated member 672 for moving the second free end portion 166 of the second lever arm 165 of the lever 160.

Figure 6A:
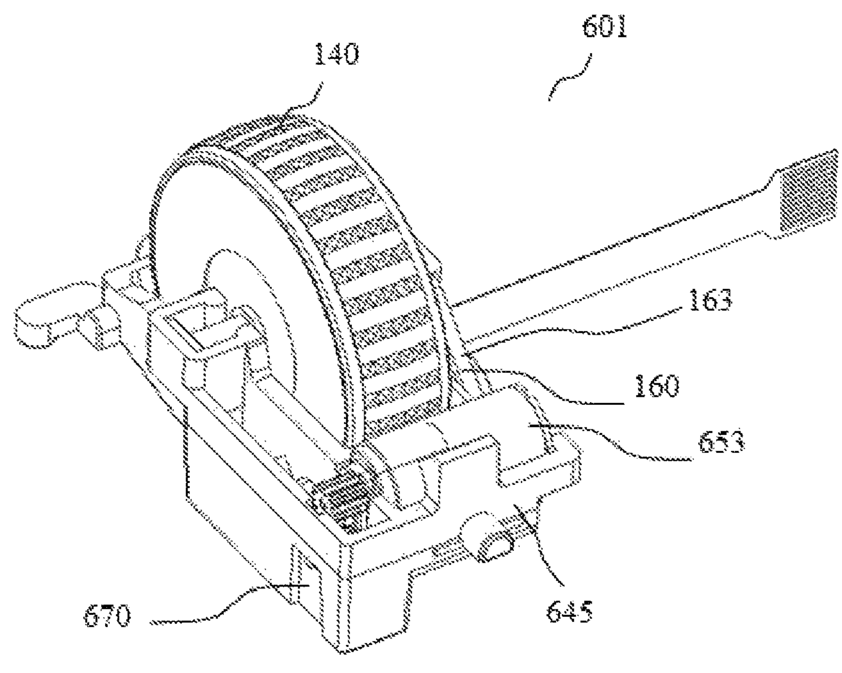
FIG. 6A to FIG. 6D show various views of another assembly of the scroll wheel and a motion converter for the mouse of FIG. 1A according to various embodiments.
Figure 6B:
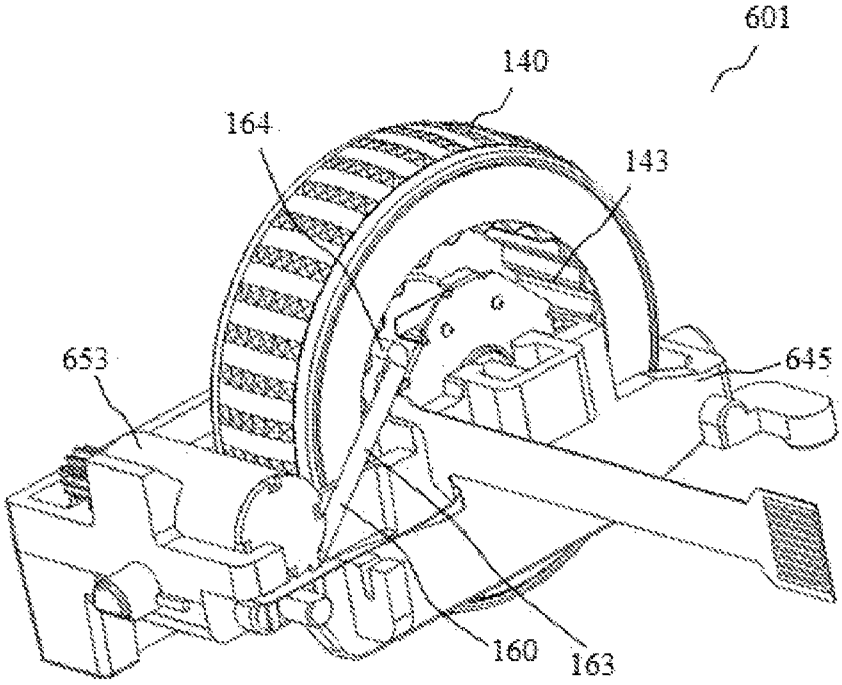
Figure 6C:
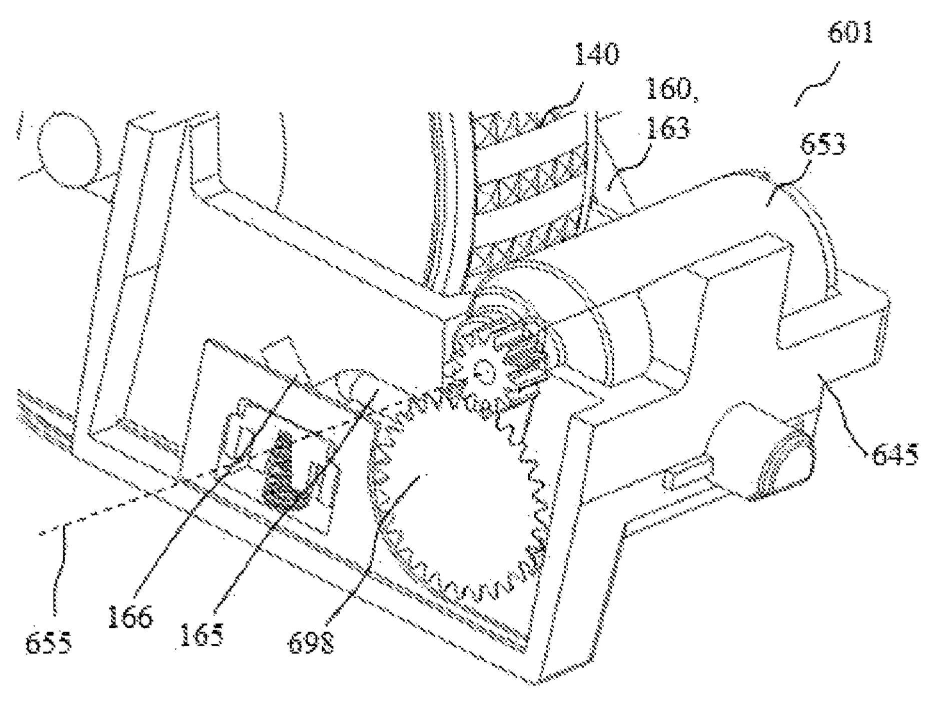
Figure 6D:
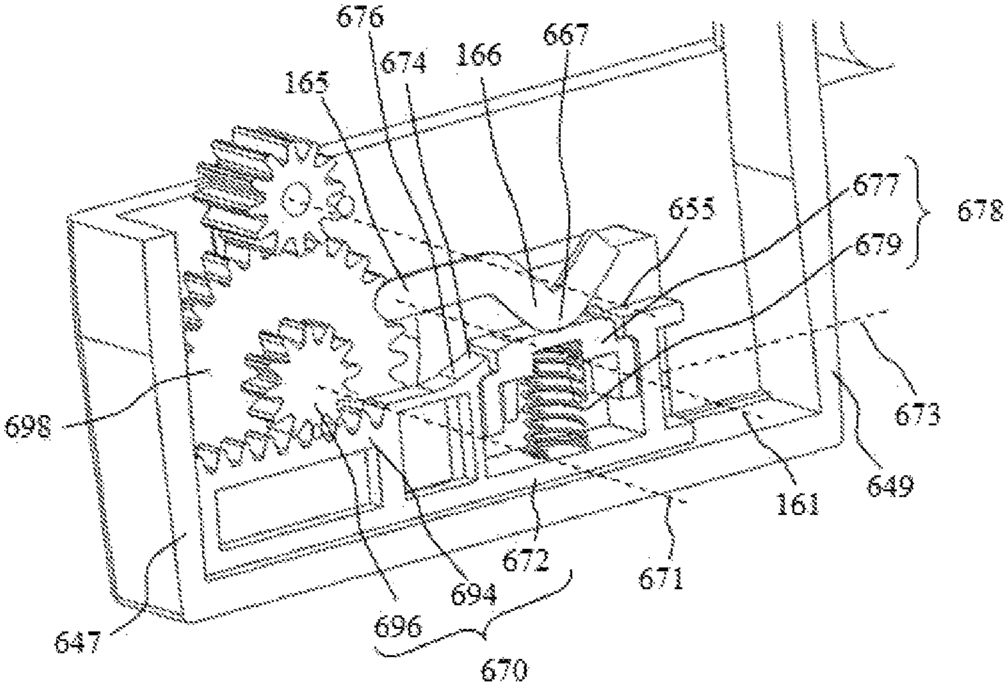

According to various embodiments, the elongated member 672 may include a projection 674 to engage or contact or abut or receive the second free end portion 166 of the second lever arm 165 of the lever 160 such that the linear motion of the elongated member 672 may be transferred or applied or transmitted or passed on to the second free end portion 166 of the lever 160 for pivoting the lever 160 about the pivot axis 161. FIG. 6C shows a partial cut out view of the scroll-wheel-bracket 645 to show part of the motion converter 670 according to various embodiments. FIG. 6D shows a cross-sectional view of the scroll-wheel-bracket 645 to show part of the motion converter 670 according to various embodiments. As shown in FIG. 6C and FIG. 6D, the projection 674 may be protruding from the elongated member 672 in a protrusion direction perpendicular to the longitudinal axis of the elongated member 672. According to various embodiments, the projection 674 may include an inclined surface 676. The inclined surface 676 may extend from a root of the projection 674 to a tip of the projection 674. According to various embodiments, the second free end portion 166 of the lever 160 may be engaged to a longitudinal side of the elongated member 672 from which the projection 674 protrudes. Accordingly, the second free end portion 166 of the lever 160 may be abutting the longitudinal side of the elongated member 672 such that moving the elongated member 672 linearly along the longitudinal axis of the elongated member 672 may cause the second free end portion 166 of the second lever arm 160 to slide along the inclined surface 676 of the projection 674 to move the second free end portion 166 of the second lever arm 160 along the protrusion direction perpendicular to the longitudinal axis of the elongated member 672 for pivoting the lever 160.

According to various embodiments, the elongated member 672 comprises a spring-loaded pusher 678 adjacent to the tip of the projection 676 and directed in the protrusion direction perpendicular to the longitudinal axis of the elongated member 672. Accordingly, the spring-loaded pusher 678 may be disposed or arranged radially with respect to the longitudinal axis of the elongated member 672. According to various embodiments, moving the elongated member 672 linearly along the longitudinal axis of the elongated member 672 may cause the second free end portion 166 of the second lever arm 165 of the lever 160 to slide on or off the spring-loaded pusher 678. Accordingly, when the second free end portion 166 of the second lever arm 165 of the lever 160 is on the spring-loaded pusher 678, the spring-loaded pusher 678 may provide a resilience cushioning effect whereby the second free end portion 166 of the second lever arm 165 of the lever 160 may compress the spring-loaded pusher 678 and the spring-loaded pusher 678 subsequently recoil or spring back or push back.

According to various embodiments, the spring-loaded pusher 678 may include a pusher member 677 movable in the protrusion direction perpendicular to the longitudinal axis of the elongated member 672 and a biasing element 679 arranged to bias the pusher member away from the longitudinal side of the elongated member 672 in the protrusion direction perpendicular to the longitudinal axis of the elongated member 672. According to various embodiments, the biasing element 679 may include, but not limited to, a spring, a coil spring, or a compression spring. According to various embodiments, when the biasing element 679 is unloaded, the pusher member 677 may flush with the tip of the projection 674 of the elongated member 672. According to various embodiments, the tip of the projection 674 of the elongated member 672 and the spring-loaded pusher 678 may be in a side-by-side arrangement in along the longitudinal axis of the elongated member 672.

According to various embodiments, the second free end portion 166 of the second lever arm 165 may include a V-shaped cross-sectional profile 667. According to various embodiments, the V-shaped cross-sectional profile 667 may be a tapered or an angled or a pointed portion at the second free end portion 166 of the second lever arm 165. According to various embodiments, a bottom of the V-shaped cross-sectional profile 667 of the second free end portion 166 may be directed perpendicularly from the second lever arm 165. Accordingly, the bottom of the V-shaped cross-sectional profile 667 of the second free end portion 166 may be pointing radially outwards from the second lever arm 165. According to various embodiments, the second free end portion 166 of the second lever arm 165 may be engaged to the elongated member 672 of the motion converter 670 with the bottom of the V-shaped cross-sectional profile 667 of the second free end portion 166 abutting the longitudinal side of the elongated member 672 so as to slide along the longitudinal side of the elongated member 672. Accordingly, the V-shaped cross-sectional profile 667 of the second free end portion 166 of the second lever arm 165 may slide up or down the inclined surface 676 as well as slide on or off the pusher member 677.

Figure 7A:
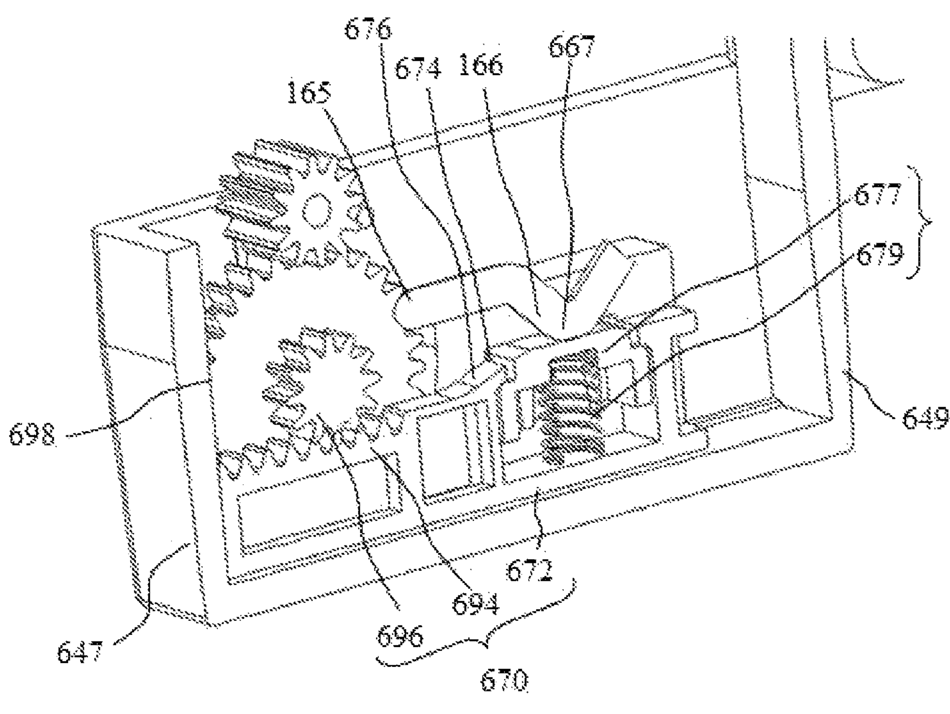
FIG. 7A and FIG. 7B show the assembly of FIG. 6A to FIG. 6D in the resistive-wheeling mode.
Figure 7B:
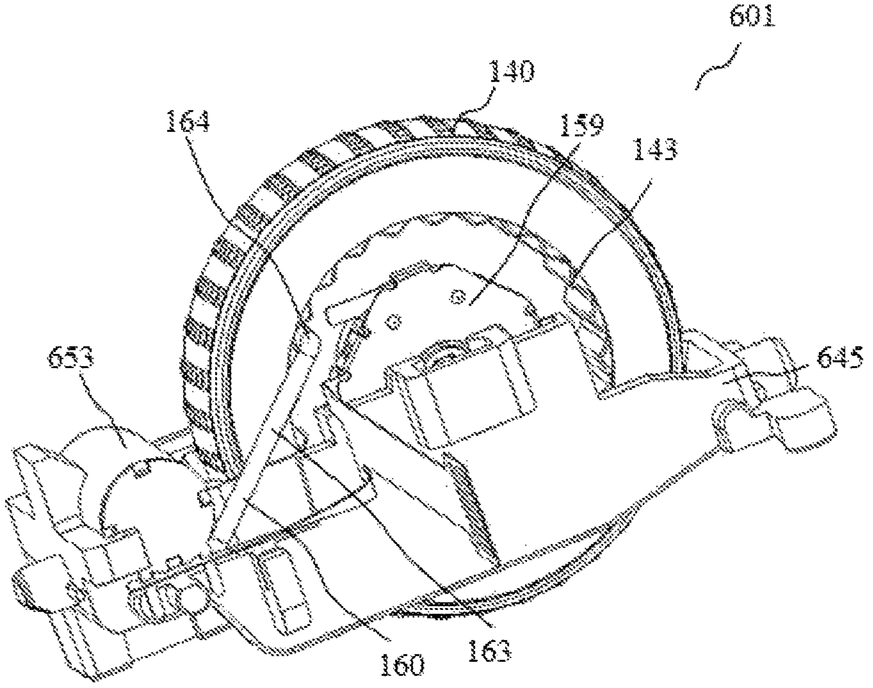

FIG. 7A shows the second free end portion 166 of the second lever arm 165 abutting the pusher member 677 of the elongated member 672 of the motion converter 670. FIG. 7B shows the first free end portion 164 of the first lever arm 163 in engagement with the arresting surface 142 of the scroll wheel 140. According to various embodiment, when the second free end portion 166 of the second lever arm 165 is moved by the elongated member 672 of the motion converter 670 such that the second free end portion 166 of the second lever arm 165 slide along the inclined surface 676 of the projection 674 onto the pusher member 677 of the elongated member 672 of the motion converter 670, the lever 160 may be pivoted such that the first free end portion 164 of the first lever arm 163 may be moved into engagement with the arresting surface 142 of the scroll wheel 140. According to various embodiments, with the second free end portion 166 of the second lever arm 165 abutting the pusher member 677 of the elongated member 672 of the motion converter 670, when the scroll wheel 140 is being rotated by the user, the first free end portion 164 of the first lever arm 163 may be moved along the profile of the plurality of serrations 143 of the scroll wheel 140 and the pusher member 677 may provide the resilient cushioning effect to allow the lever 160 to be pivoted accordingly as the first free end portion 164 of the first lever arm 163 moves along the profile of the plurality of serrations 143. Accordingly, the scroll wheel 140 may be in the resistive-wheeling mode when the second free end portion 166 of the second lever arm 165 is abutting the pusher member 677 of the elongated member 672 of the motion converter 670. According to various embodiments, an encoder 159 may be disposed inside the scroll wheel 140 to convert the rotational motion of the scroll wheel 140 during resistive-wheeling mode into output signal.

Figure 8A:
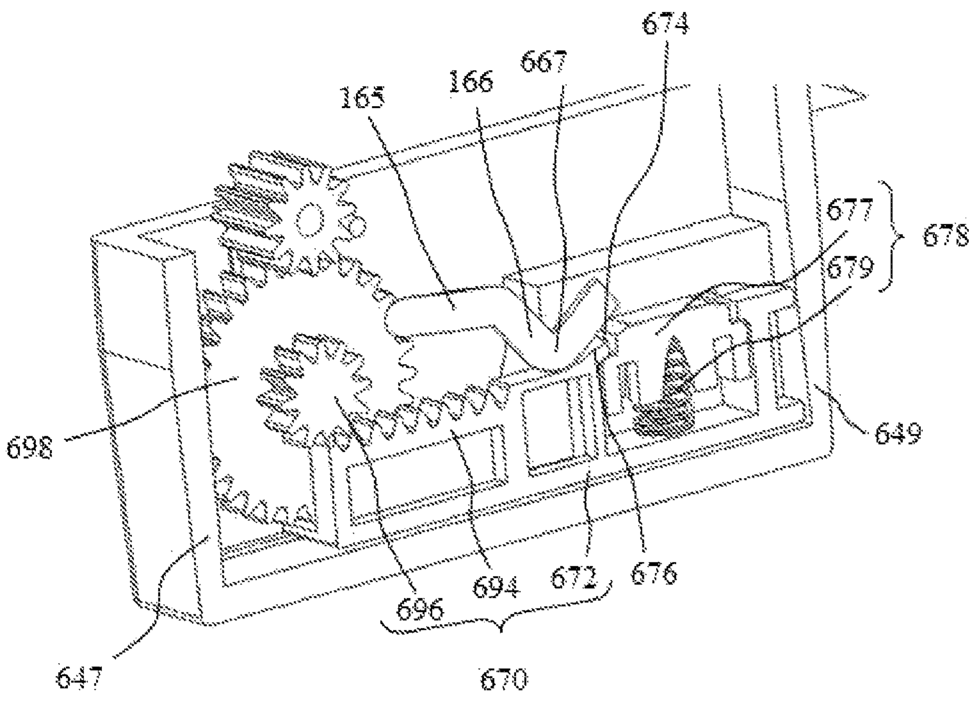
FIG. 8A and FIG. 8B show the assembly of FIG. 6A to FIG. 6D in the freewheeling mode.

FIG. 8A shows the second free end portion 166 of the second lever arm 165 in a position in which it is slidden off the pusher member 677 of the elongated member 672 of the motion converter 670 and abutting the longitudinal side of the elongated member 672 of the motion converter 670. FIG. 7B shows the first free end portion 164 of the first lever arm 163 disengaged from the arresting surface 142 of the scroll wheel 140. According to various embodiment, when the second free end portion 166 of the second lever arm 165 is moved by the elongated member 672 of the motion converter 670 such that the second free end portion 166 of the second lever arm 165 slide off the pusher member 677 of the elongated member 672 of the motion converter 670 and slide down the inclined surface 676 of the projection 674 of the elongated member 672, the lever 160 may be pivoted such that the first free end portion 164 of the first lever arm 163 may be moved away from the arresting surface 142 of the scroll wheel 140 so as to be disengaged from the arresting surface 142. Accordingly, the scroll wheel 140 may be in the free-wheeling mode when the second free end portion 166 of the second lever arm 165 is slidden off the pusher member 677 of the elongated member 672 of the motion converter 670. According to various embodiments, the encoder 159 disposed inside the scroll wheel 140 may convert the rotational motion of the scroll wheel 140 during free-wheeling mode into output signal.

Referring back to FIG. 6A to FIG. 6D, according to various embodiments, the motion converter 670 may include a rack and pinion mechanism. Accordingly, the motion converter 670 may be a rack and pinion motion converter. Accordingly, the elongated member 672 of the motion converter 670 may be connected to or in contact with a rack 694 of the motion converter 670, and a pinion 696 of the motion converter 670 may be driven by the electric motor 653. Hence, activating the electric motor 653 may impart the rotary input motion to the pinion 696 which may be converted to the linear output motion of the rack 694 of the motion converter 670 for moving the elongated member 672. According to various embodiments, the elongated member 672 may be longitudinal aligned to the rack 694 of the motion converter 670. Accordingly, the elongated member 672 and the rack 694 may form a straight line. According to various embodiments, the elongated member 672 and the rack 694 may be integral so as to move as a single unit or a single piece. Accordingly, the elongated member 672 and the rack 694 may be molded integrally, or formed integrally, or integrally joined, or integrally coupled, or integrally connected together so as to form the single unit or single piece.

Figure 8B:
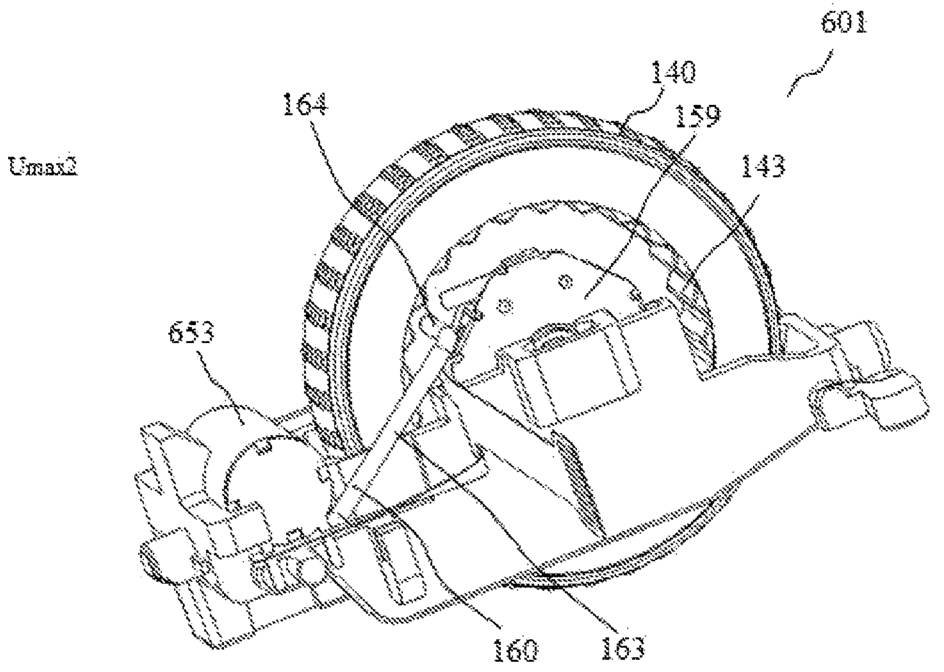

According to various embodiments, the scroll-wheel-bracket 645 may include a pair of stopper structures 647, 649, i.e. a first stopper structure 647 and a second stopper structure 649. The pair stopper structure 647, 649 may be along the longitudinal axis of the elongated member 672 of the motion converter 670 and may be spaced apart from each other such that the elongated member 672 of the motion converter 670 may be between the pair of stopper structures 647, 649. According to various embodiments, the elongated member 672 and the rack 694 may be between the pair of stopper structure 647, 649 such that pair of stopper structures 647, 649 may limit the linear movement of the elongated member 672 and the rack 694 in the longitudinal direction. According to various embodiments, when the rack 694 is abutting the first stopper structure 647, the second free end portion 166 of the second lever arm 165 may be abutting the pusher member 677 of the elongated member 672 of the motion converter 670 as shown in FIG. 7B. According to various embodiments, when the elongated member 672 is abutting the second stopper structure 649, the second free end portion 166 of the second lever arm 165 may be slidden off the pusher member 677 of the elongated member 672 of the motion converter 670 as shown in FIG. 8B.

According to various embodiments, the mouse 100 may include a transmission gear arrangement 698 coupled between the electric motor 653 and the motion converter 670. According to various embodiments, the transmission gear arrangement 698 may include at least one gear 699 between the pinion 696 and the electric motor 653. According to various embodiments, the transmission gear arrangement 698 may be a reduction gear arrangement.

According to various embodiments, the mouse 100 may include a switch 119 mounted to an exterior of the housing 110 (for example, see FIG. 1A). According to various embodiments, the switch 119 may be configured to activate the electric motor 653 to provide the rotary input motion to the motion converter 670 for conversion into the linear output motion to move the second free end portion 166 of the second lever arm 165 so as to pivot the lever 160 for engaging or disengaging the first free end portion 164 of the first lever arm 163 and the arresting surface 142 of the scroll wheel 140. According to various embodiments, the electric motor 653 may be configured to be provide the rotary input motion in a first direction and in a second opposite direction. Accordingly, the switch 119 may be configured to activate the electric motor 653 to provide the rotary input motion in the first direction or in the second opposite direction. For example, the switch 119 may include a sliding switch which may be slidable between two positions, or may include a toggle button which may be toggled between two positions. Accordingly, the switch 119 may active the electric motor 653 to provide the rotary input motion in the first direction when the switch 119 is in the first position, and may active the electric motor 653 to provide the rotary input motion in the second opposite direction when the switch 119 is in the second position.

According to various embodiments, the electric motor 653 may also be activated by a software application installed in an external processor-based device, for example, including, but not limited to, a computer or a laptop or a notebook or a tablet. Based on a user input or a parameter set in an application running on the external processor-based device, a control signal may be sent from the external processor-based device to electronic circuit assembly of the mouse 100. The electronic circuit assembly of the mouse 100 may include a controller which may process the control signal to control the activation of the electric motor 653.

According to various embodiments, there is provided an input device for communication with a processor-based device. The input device may include a housing. The input device may also include a scroll wheel which is mounted on the housing in a manner so as to be rotatable about a first axis and so as to be partly exposed from the housing to be accessible by a user of the input device. The scroll wheel may include an arresting surface which extends circumferentially about the first axis. The input device may further include a lever which is provided with first and second lever arms and which is mounted on the housing so as to be pivotable about a pivot axis which extends between the first and second lever arms. A first free end portion of the first lever arm may be configured to engage the arresting surface of the scroll wheel with an engagement force to arrest a rotation of the scroll wheel with a corresponding arresting force. The input device may further include an auxiliary wheel which is mounted on the housing in a manner so as to be rotatable about a second axis and so as to be partly exposed from the housing to be accessible by the user. The input device may further include a motion converter connected to the auxiliary wheel as well as to a second free end portion of the second lever arm. The motion converter may be configured to convert a rotational motion of the auxiliary wheel into a linear motion and to apply said linear motion to the second free end portion of the second lever arm so as to pivot the lever about the pivot axis to correspondingly adjust the engagement force exerted by the first free end portion of the first lever arm on the arresting surface of the scroll wheel, whereby the corresponding arresting force applied to the scroll wheel may be correspondingly adjustable by rotation of the auxiliary wheel.

According to various embodiments, the first axis of the scroll wheel of the input device, the second axis of the auxiliary wheel of the input device and the pivot axis of the lever of the input device may be at least substantially parallel to each other.

According to various embodiments, a portion of the auxiliary wheel of the input device may be exposed through an opening. The opening may be in a recess of the housing of the input device.

According to various embodiments, the arresting surface of the scroll wheel of the input device may include a plurality of serrations.

According to various embodiments, the first free end portion of the first lever arm of the lever of the input device may include a finger configured to fit into a respective notch between respective two adjacent serrations of the plurality of serrations of the arresting surface of the scroll wheel of the input device.

According to various embodiments, the input device may further include a biasing mechanism connected to the first lever arm to apply a biasing force on the first free end portion of the first lever arm so as to bias the first free end portion of the first lever arm towards the arresting surface of the scroll wheel to exert the engagement force by the first free end portion of the first lever arm on the arresting surface of the scroll wheel.

According to various embodiments the motion converter of the input device may be configured to apply the linear motion to the second free end portion of the second lever arm to pivot the lever about the pivot axis so as to correspondingly counter the biasing force exerted by the biasing mechanism on the first free end portion of the first lever arm to correspondingly adjust the engagement force exerted by the first free end portion of the first lever arm on the arresting surface of the scroll wheel.

According to various embodiments, the biasing mechanism of the input device may include a torsion spring.

According to various embodiments, the motion converter of the input device may include an elongated member which may be configured to be movable linearly along a longitudinal axis of the elongated member and which may be connected to the second free end portion of the second lever arm so as to apply the linear motion to the second free end portion of the second lever arm.

According to various embodiments, the motion converter of the input device may include a rack and pinion mechanism, wherein the elongated member of the motion converter may be connected to the rack, and the pinion of the motion converter may be connected to the auxiliary wheel.

According to various embodiments, the motion converter of the input device may include a nut and screw shaft mechanism, wherein the elongated member of the motion converter may be connected to the screw shaft, and the roller of the motion converter may be connected to the auxiliary wheel.

According to various embodiments, the motion converter of the input device may include a crank and slider mechanism, wherein the elongated member of the motion converter may be connected to the slider, and the crank of the motion converter may be connected to the auxiliary wheel.

According to various embodiments, the lever of the input device may include an elongated connection section which forms a pivot axle defining the pivot axis of the lever and via which the first and second lever arms are fixedly connected to each other, wherein the pivot axle extends at least substantially perpendicular to a respective longitudinal extension direction of both the first and second lever arms.

According to various embodiments, the elongated connection section of the lever of the input device may include first and second section ends which are connected to a first connection end, opposite to the first free end portion, of the first lever arm and to a second connection end, opposite to the second free end portion, of the second lever arm, respectively.

According to various embodiments, there is provided an input device for communication with a processor-based device. The input device may include a housing. The input device may also include a rotatable scroll wheel which is mounted on the housing so as to be partly exposed from the housing to be accessible by a user of the input device. The scroll wheel may include an arresting surface. The input device may further include a lever which is provided with first and second lever arms and which is pivotably mounted to the housing between the first and second lever arms. The lever may be pivotable to move a first free end portion of the first lever arm to engage with or disengage from the arresting surface of the scroll wheel so as to interchange the scroll wheel between a free-wheeling mode and a resistive-wheeling mode. The input device may further include a rotary to linear motion converter having a rotary input axis and a linear output axis. The rotary to linear motion converter being in engagement with a second free end portion of the second lever arm. The rotary to linear motion converter may be configured to convert a rotary input motion about the rotary input axis into a linear output motion along the linear output axis for moving the second free end portion of the second lever arm so as to pivot the lever about the pivot axis for engaging or disengaging the first free end portion of the first lever arm and the arresting surface of the scroll wheel. The pivot axis of the lever and the rotary input axis of the rotary to linear motion converter may be substantially parallel to each other.

According to various embodiments, the arresting surface of the scroll wheel may include a plurality of serrations. According to various embodiments, the first free end portion of the first lever arm may include a finger configured to fit into a respective notch between respective two adjacent serrations of the plurality of serrations of the arresting surface.

According to various embodiments, the lever may include an elongated connection section which may form a pivot axle defining the pivot axis of the lever and via which the first and second lever arms may be fixedly connected to each other. According to various embodiments, the pivot axle may extend at least substantially perpendicular to a respective longitudinal extension direction of both the first and second lever arms.

According to various embodiments, the elongated connection section may include first and second section ends which may be connected to a first connection end, opposite to the first free end portion, of the first lever arm and to a second connection end, opposite to the second free end portion, of the second lever arm, respectively.

According to various embodiments, the input device may further include an electric motor coupled to the rotary to linear motion converter to provide the rotary input motion for conversion into the linear output motion to move the second free end portion of the second lever arm.

According to various embodiments, the input device may further include a switch mounted to an exterior of the housing, the switch may be configured to activate the electric motor to provide the rotary input motion in a first direction or in a second opposite direction.

According to various embodiments, the rotary to linear motion converter may include an elongated member which may be configured to be movable linearly along a longitudinal axis of the elongated member and which may be in engagement with the second free end portion of the second lever arm so as to move the second free end portion of the second lever arm as the elongated member is moved linearly by the linear output motion of the rotary to linear motion converter.

According to various embodiments, there is provided an input device for communication with a processor-based device. The input device may include a housing. The input device may also include a rotatable scroll wheel which is mounted on the housing so as to be partly exposed from the housing to be accessible by a user of the input device. The scroll wheel may include an arresting surface. The input device may further include a lever which is provided with first and second lever arms and which is pivotably mounted to the housing between the first and second lever arms. The lever may be pivotable to move a first free end portion of the first lever arm to engage with or disengage from the arresting surface of the scroll wheel so as to interchange the scroll wheel between a free-wheeling mode and a resistive-wheeling mode. The input device may further include a rotary to linear motion converter in engagement with a second free end portion of the second lever arm. The rotary to linear motion converter may be configured to convert a rotary input motion into a linear output motion for moving the second free end portion of the second lever arm so as to pivot the lever about the pivot axis for engaging or disengaging the first free end portion of the first lever arm and the arresting surface of the scroll wheel. The rotary to linear motion converter may include an elongated member which is configured to be movable linearly along a longitudinal axis of the elongated member and which is in engagement with the second free end portion of the second lever arm so as to move the second free end portion of the second lever arm as the elongated member is moved linearly by the linear output motion of the rotary to linear motion converter.

According to various embodiments, the elongated member may include a projection to engage the second free end portion of the second lever arm, wherein the projection may be protruding from the elongated member in a protrusion direction perpendicular to the longitudinal axis of the elongated member. According to various embodiments, the projection may include an inclined surface, wherein the second free end portion of the second lever arm may be engaged to a longitudinal side of the elongated member from which the projection protrudes such that moving the elongated member linearly along the longitudinal axis of the elongated member may cause the second free end portion of the second lever arm to slide along the inclined surface of the projection to move the second free end portion of the second lever arm along the protrusion direction perpendicular to the longitudinal axis of the elongated member for pivoting the lever.

According to various embodiments, the elongated member may include a spring-loaded pusher adjacent to a tip of the projection and directed in the protrusion direction perpendicular to the longitudinal axis of the elongated member, wherein moving the elongated member linearly along the longitudinal axis of the elongated member may cause the second free end portion of the second lever arm to slide on or off the spring-loaded pusher. According to various embodiments, the spring-loaded pusher may include a pusher member movable in the protrusion direction perpendicular to the longitudinal axis of the elongated member and a biasing element arranged to bias the pusher member away from the longitudinal side of the elongated member in the protrusion direction perpendicular to the longitudinal axis of the elongated member.

According to various embodiments, the second free end portion of the second lever arm may include a V-shaped cross-sectional profile, wherein a bottom of the V-shaped cross-sectional profile may be directed perpendicularly from the second lever arm.

According to various embodiments, the input device may further include an electric motor coupled to the rotary to linear motion converter to provide the rotary input motion for conversion into the linear output motion to move the second free end portion of the second lever arm. According to various embodiments, the pivot axis of the lever and a rotational driving axis of the electric motor may be substantially parallel to each other.

According to various embodiments, there is provided an input device for communication with a processor-based device. The input device may include a housing. The input device may also include a rotatable scroll wheel which is mounted on the housing so as to be partly exposed from the housing to be accessible by a user of the input device. The scroll wheel may include an arresting surface. The input device may further include a lever which is provided with first and second lever arms and which is pivotably mounted to the housing between the first and second lever arms. The lever may be pivotable to move a first free end portion of the first lever arm to engage with or disengage from the arresting surface of the scroll wheel so as to interchange the scroll wheel between a free-wheeling mode and a resistive-wheeling mode. The input device may further include a rack and pinion motion converter in engagement with a second free end portion of the second lever arm. The rack and pinion converter may be configured to convert a rotary input motion into a linear output motion for moving the second free end portion of the second lever arm so as to pivot the lever about the pivot axis for engaging or disengaging the first free end portion of the first lever arm and the arresting surface of the scroll wheel. The pivot axis of the lever and a rotary input axis of the rack and pinion motion converter may be substantially parallel to each other. The rack and pinion motion converter may include an elongated member which is configured to be movable linearly along a longitudinal axis of the elongated member and which is in engagement with the second free end portion of the second lever arm so as to move the second free end portion of the second lever arm as the elongated member is moved linearly by the linear output motion of the rack and pinion motion converter.

According to various embodiments, the arresting surface of the scroll wheel may include a plurality of serrations, wherein the first free end portion of the first lever arm may include a finger configured to fit into a respective notch between respective two adjacent serrations of the plurality of serrations of the arresting surface.

According to various embodiments, the lever may include an elongated connection section which may form a pivot axle defining the pivot axis of the lever and via which the first and second lever arms may be fixedly connected to each other, wherein the pivot axle may extend at least substantially perpendicular to a respective longitudinal extension direction of both the first and second lever arms, wherein the elongated connection section may include first and second section ends which may be connected to a first connection end, opposite to the first free end portion, of the first lever arm and to a second connection end, opposite to the second free end portion, of the second lever arm, respectively.

According to various embodiments, the input device may further include an electric motor coupled to the rack and pinion motion converter to provide the rotary input motion for conversion into the linear output motion to move the second free end portion of the second lever arm.

According to various embodiments, the elongated member may include a projection to engage the second free end portion of the second lever arm, wherein the projection may be protruding from the elongated member in a protrusion direction perpendicular to the longitudinal axis of the elongated member.

According to various embodiments, there is provided an input device for communication with a processor-based device. The input device may include a housing. The input device may also include a rotatable scroll wheel which is mounted on the housing so as to be partly exposed from the housing to be accessible by a user of the input device. The scroll wheel may include an arresting surface. The input device may further include a lever which is provided with first and second lever arms and which is pivotably mounted to the housing between the first and second lever arms. The lever may be pivotable to move a first free end portion of the first lever arm to engage with or disengage from the arresting surface of the scroll wheel so as to interchange the scroll wheel between a free-wheeling mode and a resistive-wheeling mode. The input device may further include a motion converter having a rotary input axis and a linear output axis. The motion converter being in engagement with a second free end portion of the second lever arm. The input device may further include an electric motor coupled to the motion converter. The motion converter may be configured to convert a rotary input motion about the rotary input axis provided by the electric motor into a linear output motion along the linear output axis for moving the second free end portion of the second lever arm so as to pivot the lever about the pivot axis for engaging or disengaging the first free end portion of the first lever arm and the arresting surface of the scroll wheel.

According to various embodiments, the pivot axis of the lever and a rotational driving axis of the electric motor may be parallel to each other.

According to various embodiments, the motion converter may include an elongated member which may be configured to be movable linearly along a longitudinal axis of the elongated member and which may be in engagement with the second free end portion of the second lever arm so as to move the second free end portion of the second lever arm as the elongated member is moved linearly by the linear output motion of the motion converter. According to various embodiments, the elongated member may include a projection to engage the second free end portion of the second lever arm. According to various embodiments, the projection may be protruding from the elongated member in a protrusion direction perpendicular to the longitudinal axis of the elongated member.

According to various embodiments, the projection may include an inclined surface. According to various embodiments, the second free end portion of the second lever arm may be engaged to a longitudinal side of the elongated member from which the projection protrudes such that moving the elongated member linearly along the longitudinal axis of the elongated member may cause the second free end portion of the second lever arm to slide along the inclined surface of the projection to move the second free end portion of the second lever arm along the protrusion direction perpendicular to the longitudinal axis of the elongated member for pivoting the lever.

According to various embodiments, the elongated member may include a spring-loaded pusher adjacent to a tip of the projection and directed in the protrusion direction perpendicular to the longitudinal axis of the elongated member. According to various embodiments, moving the elongated member linearly along the longitudinal axis of the elongated member may cause the second free end portion of the second lever arm to slide on or off the spring-loaded pusher.

According to various embodiments, the spring-loaded pusher may include a pusher member movable in the protrusion direction perpendicular to the longitudinal axis of the elongated member and a biasing element arranged to bias the pusher member away from the longitudinal side of the elongated member in the protrusion direction perpendicular to the longitudinal axis of the elongated member.

According to various embodiments, the second free end portion of the second lever arm may include a V-shaped cross-sectional profile, wherein a bottom of the V-shaped cross-sectional profile may be directed perpendicularly from the second lever arm.

According to various embodiments, the motion converter may include a rack and pinion mechanism, wherein the elongated member of the motion converter may be connected to a rack of the motion converter in a straight line, and a pinion of the motion converter may be driven by the electric motor.

According to various embodiments, the input device may further include a first stopper structure and a second stopper structure spaced apart from each other, wherein the elongated member and the rack may be between the pair of stopper structure in a manner such that the first stopper structure and the second stopper structure may limit linear movement of the elongated member and the rack along the longitudinal axis of the elongated member.

According to various embodiments, the input device may further include a switch mounted to an exterior of the housing, the switch may be configured to activate the electric motor to provide the rotary input motion in a first direction or in a second opposite direction.

Figure 9A:
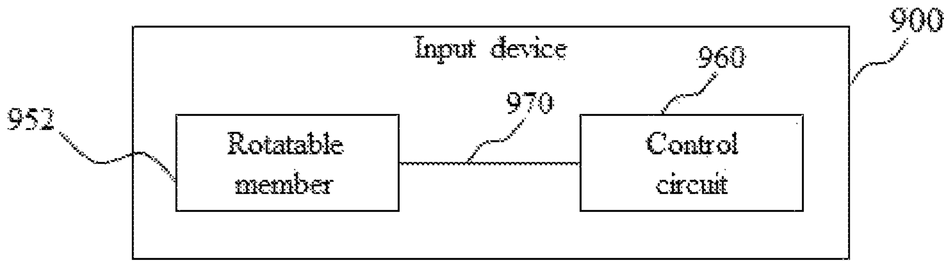
FIG. 9A shows a conceptual diagram of an input device according to various embodiments.

FIG. 9A shows a conceptual diagram of an input device 900 according to various embodiments. The input device 900 may be used to control scrolling in a computer application running on a computer connected to the input device 900. The input device 900 may include a rotatable member 952. The rotatable member 952 may be a scroll wheel, for example, the scroll wheel 140 of the mouse 100. The input device 900 may be configured to generate user input data that is indicative of a rotational speed of the rotatable member 952. The input device 900 may further include a control circuit 960. The rotatable member 952 and the control circuit 960 may be coupled to one another, for example, communicatively, electrically, and/or mechanically, as indicated by the line 970. The control circuit 960 may include a processor, and a software that is executable by the processor. In alternative embodiments, the control circuit 960 may be external to the mouse 100. The control circuit 960 may include an input device driver software that is executable by a computer that is connected to the input device 900.

According to various embodiments, the input device 900 may switch between two scroll input modes, namely a direct control mode and a virtual scroll mode.

According to various embodiments, the input device 900 may include the mouse 100. The input device 900 may selectively operate in any one of the direct control mode and a virtual scroll mode, regardless of the mechanical operation mode, i.e. resistive-wheeling mode or free-wheeling mode, of the input device 900. In other words, the mechanical operation mode of the input device 900 may be any one of the resistive-wheeling mode and free-wheeling mode, while the scroll input mode may be the direct control mode. Also, the mechanical operation mode of the input device 900 may be any one of the resistive-wheeling mode and free-wheeling mode, while the scroll input mode may be the virtual scroll mode. In an alternative embodiment, the input device 900 may not be configured to switch between the resistive-wheeling mode and the free-wheeling mode.

Figure 9B:
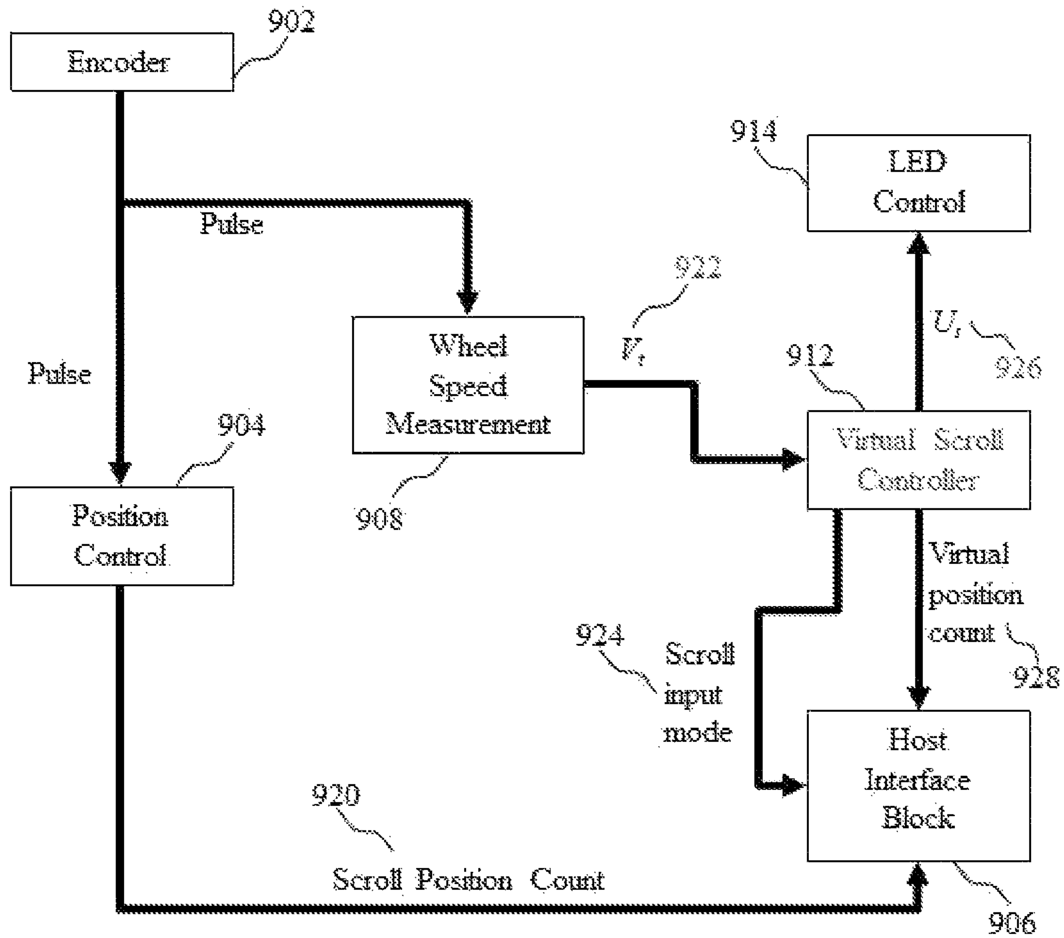
FIG. 9B shows a block diagram of the input device of FIG. 9A.

FIG. 9B shows a block diagram of the input device 900 according to various embodiments. The input device 900 may include an encoder 902. The encoder 902 may be configured to detect pulses generated by the rotatable member 952 when the rotatable member 952 rotates. The rotatable member 952 may include mechanical or optical switches that may generate a pulse every time the rotatable member 952 is rotated by a predefined angle. The encoder 902 may transmit the pulses generated by the rotatable member 952 to a position control module 904. The position control module 904 may count the number of pulses received from the encoder 902 to generate a scroll position count 920 based on the number of pulses received. The scroll position count 920 may be indicative of an amount of rotation. The position control module 904 may transmit the scroll position count 920 to a host interface block 906. The encoder 902 may also send the pulse generated by the encoder 902, to a wheel speed measurement module 908. The wheel speed measurement module 908 may measure the average frequency of the pulses by counting the number of pulses detected over a measurement period, for example, over 100 ms. The wheel speed measurement module 908 may compute a rotational velocity of the rotatable member 952 based on the average frequency of the pulses, and may transmit the rotational velocity of the rotatable member 952 to a virtual scroll controller 912. The rotational velocity may also be referred herein as the input velocity Vt 922.

The virtual scroll controller 912 may select a scroll input mode 924 from either the direct control mode or the virtual scroll mode, based on $V_t$ 922. The virtual scroll controller 912 may select the virtual scroll mode when $V_t$ 922 exceeds a direct control mode threshold, $_{VDCT}$. The virtual scroll controller 912 may output the selected scroll input mode 924 to the host interface block 906. Once the virtual scroll controller 912 has selected the virtual scroll mode as the scroll input mode 924, the scroll input mode 924 may remain as the virtual scroll mode until all of the virtual scroll states have completed, or when $V_t$ 922 as measured by the wheel speed measurement 908 changes in direction. When $V_t$ 922 changes in direction, the virtual scroll controller 912 may change the scroll input mode 924 to the direct control mode.

The virtual scroll controller 912 may also be configured to initialize the virtual scroll state in the virtual scroll mode. The virtual scroll controller 912 may further select the subsequent virtual scroll states in the virtual scroll mode. The virtual scroll states may be selected from idle state, ramp up state, cruise state, and ramp down state. Each virtual scroll state may be associated with a respective output function. The virtual scroll controller 912 may compute an output velocity $U_t$ 926 based on the output function associated with the selected virtual scroll state. In the virtual scroll mode, the output velocity 926 may be higher than physically allowable by the input device 900. The output velocity 926 may be non-zero even when the rotatable member 952 is not rotating, such that the time duration of scrolling in the computer application may be longer than a time duration of user input through the rotatable member 952. The relationship between $V_t$ 922 and $U_t$ 926 in the virtual scroll mode will be described with respect to FIGS. 10A to 10C, and FIGS. 13A to 13C.

The virtual scroll controller 912 may compute a virtual position count 928 based on the output velocity 926. The virtual position count 928 may indicate an amount of rotation, like the scroll position count 920, except that it is generated by the virtual scroll controller 912, instead of being computed directly based on the number of pulses generated by the encoder 902.

The host interface block 906 may read the scroll position count 920 or the virtual position count 928 at a fixed update frequency, in other words, updated once every update time interval, for example, once every 100 milliseconds. Each of the position control module 904 and the virtual scroll controller 912 may reset their respective scroll position count 920 and virtual position count after the counts are read by the host interface block 906. The host interface block 906 may transmit the count value (either scroll position count 920 or the virtual position count 928) to the computer that the input device 900 is connected to, at the fixed update frequency. The computer may translate the count value into a corresponding amount of scrolling in a computer application. As the host interface block 906 transmits the count value at a regular frequency, the higher the count value, the higher the speed of the scrolling action in the computer application.

Based on the received scroll input mode 924, the host interface block 906 may transmit either the scroll position count 920 or the virtual position count 928 to the computer connected to the input device 900. When the virtual scroll controller 912 outputs the direct control mode as the scroll input mode 924, the host interface block 906 may transmit the scroll position count 920 to the computer. When the virtual scroll controller 912 outputs the virtual scroll mode as the scroll input mode 924, the host interface block 906 may transmit the virtual position count 928 to the computer.

Consequently, when the input device 900 is operating in the direct control mode, the scrolling action that is effected in the computer application may be directly dependent on the rotation speed of the rotatable member 952. On the other hand, when the input device 900 is operating in the virtual scroll mode, the scrolling action that is effected in the computer application is determined by the virtual scroll controller 912.

The virtual scroll speed controller 912 may further transmit the output velocity 926, $U_t$, to a light emitting diode (LED) control module 914. The LED control module 914 may operate one or more light emitters or LEDs on the input device based on the scroll input mode or the output velocity 926 such that the LEDs emit a lighting pattern that visually represents the output velocity 926, i.e. representative of the scrolling speed in the application. For example, the blinking frequency of the LEDs may be proportional to the scrolling speed in the application. As an example, the blinking frequency (in hertz) may be determined by multiplying the output velocity 926 by a factor of 10. By way of example, the LEDs on the input device emit light through light emitting regions that are positioned along the scroll wheel, through a product logo on a top surface of the input device or other light pipes on any other surfaces of the input device.

According to various embodiments, at least one of the wheel speed measurement module 908 and the virtual scroll speed controller 912 may be part of the control circuit 960.

Figure 10A:
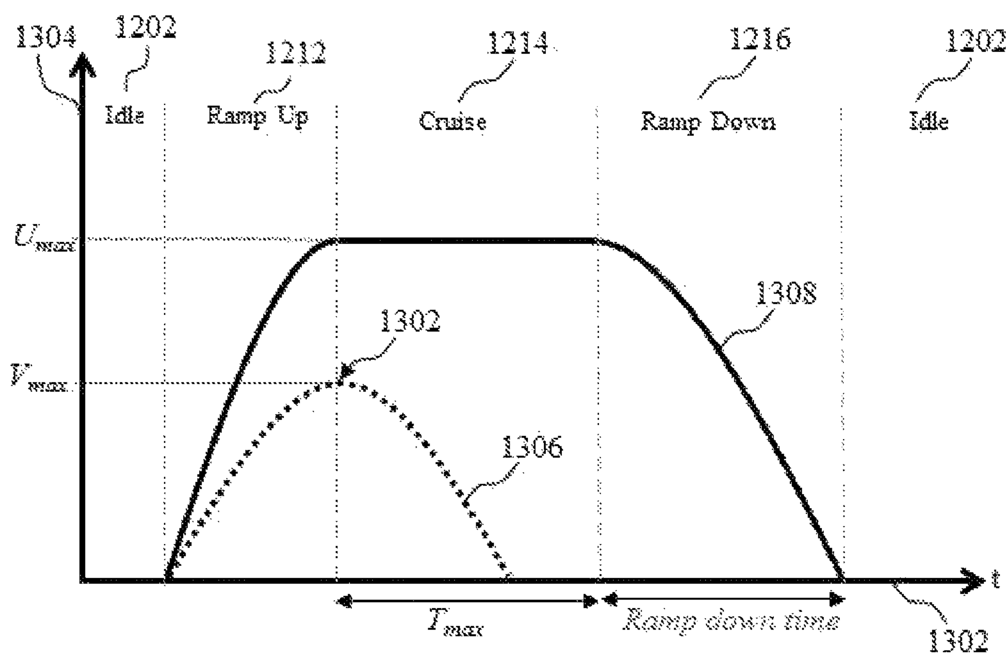
FIGS. 10A to 10C are graphs that illustrate the relationship between an input velocity and an output velocity in a virtual scroll mode, according to various embodiments.
Figure 10B:
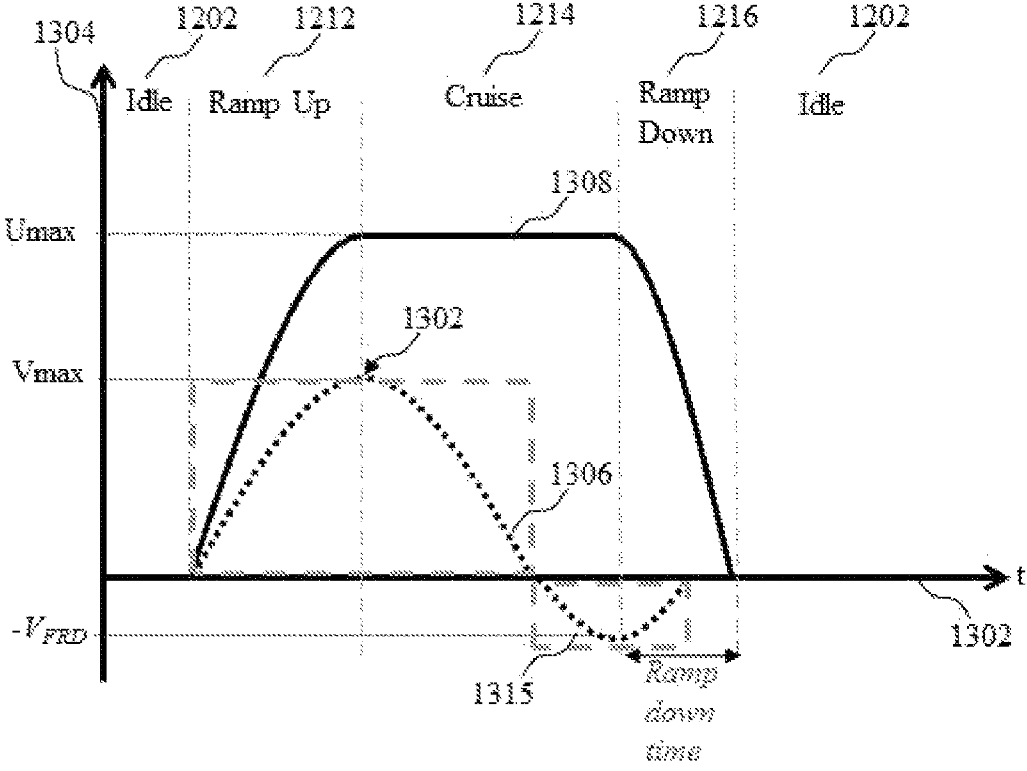
Figure 10C:
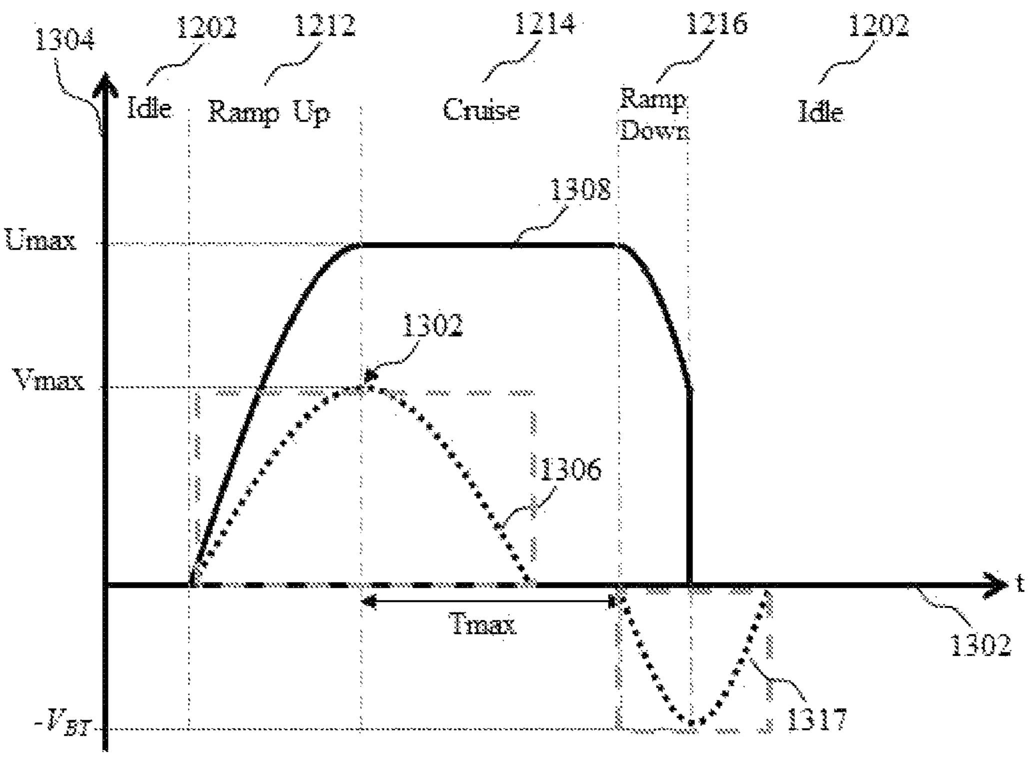

FIGS. 10A to 10C are graphs that illustrate the relationship between the input velocity $V_t$ and the output velocity $U_t$ in the virtual scroll mode, according to various embodiments. As described with respect to FIG. 9B, the input velocity $V_t$ is an output of the wheel speed measurement module 908, while the output velocity $U_t$ is an output of the virtual scroll controller 912. $V_t$ may indicate the rotational velocity of the rotatable member 952, while $U_t$ may indicate the scrolling speed in the computer application when the input device 900 is operating in the virtual scroll mode.

Each of the graphs include a horizontal axis 1302 that represents sampling time, t, as well as a vertical axis 1304 that represents velocity. Each graph also includes a dashed-line plot that represents $V_t$; and a solid-line plot 1308 that represents $U_t$.

Referring to FIG. 10A, the virtual scroll mode may include a plurality of virtual scroll states, namely, idle state 1202, ramp up state 1212, cruise state 1214, and ramp down state 1216.

An initial state of the virtual scroll mode may be the idle state 1202. In the idle state 1202, both $V_t$ and $U_t$ may be zero.

A user of the input device 900 may provide an input 1306 by turning the rotatable member 952, for example, by flicking the rotatable member 952 once. $V_t$ may increase from zero to Vmax, and then back to zero, in a parabolic curve.

The idle state 1202 may end and the ramp up state 1212 may begin, once $V_t$ is non-zero, i.e. when the rotatable member 952 is rotated. In the ramp up state 1212, Vt may be accelerating. In the ramp up state, the value of $U_t$ may depend on Vt. Ut may be higher than $V_t$ and may also increase at a faster rate than $V_t$. The virtual scroll controller 912 may determine $U_t$ based on $V_t$, and an acceleration factor (AF). $U_t$ in the ramp up state 1212 may be expressed as:

$$Ut = \text{Scrollup\_speed}\ (Vi)$$

$$\text{where Scrollup\_speed}\ (Vi) = V\ xAF$$

The acceleration factor may be user-definable through a driver software. The acceleration factor may lie in a range from 0.25 to 5, for example, possible values include 0.5, 1, 1.5, 2, and 3.

As $V_t$ reaches a local maxima 1302, where $V_t$ ceases to increase any further, the virtual scroll state may switch from the ramp up state 1212 to the cruise state 1214. The value of $V_t$ at the local maxima 132 is denoted as Vmax. The value of Ut when Vt Vmax, is denoted as Umax. In other words, Umax=Scrollup_speed(Vmax).

In the cruise state 1214, $U_t$ may remain at least substantially uniform at the last known output speed of the ramp up state 1212, $U_{max}$, even as $V_t$ decreases to zero. As such, Umax may also be referred herein as the output cruise speed. In other words, in the cruise state 1214, Ut=Umax. In the cruise state 1214, Ut may be independent of Vt.

If there is no further user input, such that $V_t$ drops to zero after peaking at the local maxima 1302, the cruise state 1214 may continue for a cruise time, Tmax. Tmax may be directly proportional to Umax. The virtual scroll controller 912 may compute Tmax based on Umax, as follows:

$$T\max = \text{Scroll\_duration}(U\max),$$

$$\text{where Scroll\_duration}(U) = U \times \text{Inertia Factor}\ [sec]$$

The inertial factor (IF) may be selectable by the user, for example, entered as an input to a device driver software. The inertial factor may be selectable from 0 to 1, in incremental values of 0.1. The higher the output cruise speed, the longer the cruise duration may be.

Following the cruise state 1214 may be the ramp down state 1216. In the ramp down state 1216, $U_t$ may decrease over a ramp down time to zero. In the ramp down state 1216, $U_t$ may decelerate linearly. If there is no user input, $U_t$ may decrease gradually. If the user provides an active braking input, $U_t$ may decrease sharply.

The virtual scroll controller 912 may compute the value of $U_t$ in the ramp down state 1216, as follows:

$$Ut = \text{Scrolldown\_speed}(U_{max},\ Tdown),$$

where Scrolldown_speed($U_{max}$,Tdown)=Umax−(Deceleration Factor×t), and Tdown is a flag which may be set as "Fast" or "Slow".

The deceleration factor (DF) may be dependent on $T_{down}$. In other words, DF may have a "SLOW" value when Tdown is set to "Slow" and DF may have a "FAST" value when Tdown is set to "Fast". The values of DF may be selectable by the user. For example, the deceleration factor when Tdown is set to "Slow", may be in a range of 0.5 to 1 for t=100 ms. For example, the deceleration factor when $T_{down}$ is set to "Fast" may be in a range of 5 to 10, for t=100 ms.

After $U_t$ has decreased to zero, the virtual scroll state may revert to the idle state 1202.

This virtual scroll mode may be similar to a bicycle chain freewheeling mechanism—the bicycle chain wheel mechanism may enable a cyclist to pedal fast for a short while and then stop pedalling, while the bicycle will continue to cruise for some time before it stops. Similarly, the virtual scroll mode with its various virtual scroll states, emulate the behaviour of the bicycle chain well. $U_t$ may maintain at Umax for the cruise time Tmax, even after $V_t$ has dropped to zero. In other words, in the virtual scroll mode, the time duration of the scrolling in the computer application may be longer than the time duration of rotation of the rotatable member.

FIG. 10B is similar to FIG. 10A, except that the ramp down time is shortened due to a soft braking input provided by the user, i.e. The ramp down time (Tdown) is set to "Fast". FIG. 10B shows that a soft braking input 1315 is provided right after an end of the input 1306. The soft braking input 1315 may be a negative input velocity. The user may generate the soft braking input 1315 by changing the rotation direction of the rotatable member, for example by flicking the rotatable member 952. The soft braking input 1315 may be a parabolic curve.

When the rotation direction of the rotatable member changes and reaches a maximum magnitude that meets or exceeds a fast ramp down threshold, IVFRDI, the virtual scroll controller 912 may switch the virtual scroll state from the cruise state 1214, to the ramp down state 1216. On detection of the change in the rotation direction of the rotatable member, the virtual scroll controller 912 may apply the fast deceleration factor, in its computation of $U_t$. Consequently, the ramp down time may be shorter as compared to the ramp down time shown in FIG. 10A when Tdown is "Fast".

FIG. 10C shows the input and output velocities, when the user provides a hard braking input 1317 during the ramp down state 1216. The hard braking input 1317 may be similar to the soft braking input 1315, but with a larger maximum magnitude that exceeds a braking threshold $|V_{BT}|$. Upon receiving from the wheel speed measurement module 908, information that the input velocity meets or exceeds the braking threshold, the virtual scroll controller 912 may switch the virtual scroll state to the idle state 1202.

According to alternative embodiments, the virtual scroll state may switch to the idle state 1202, ramp down state 1216 or other states based on other types of user input. For example, when the rotatable member is depressed in a downward motion, or when one of the other input device buttons are activated.

Figure 11:
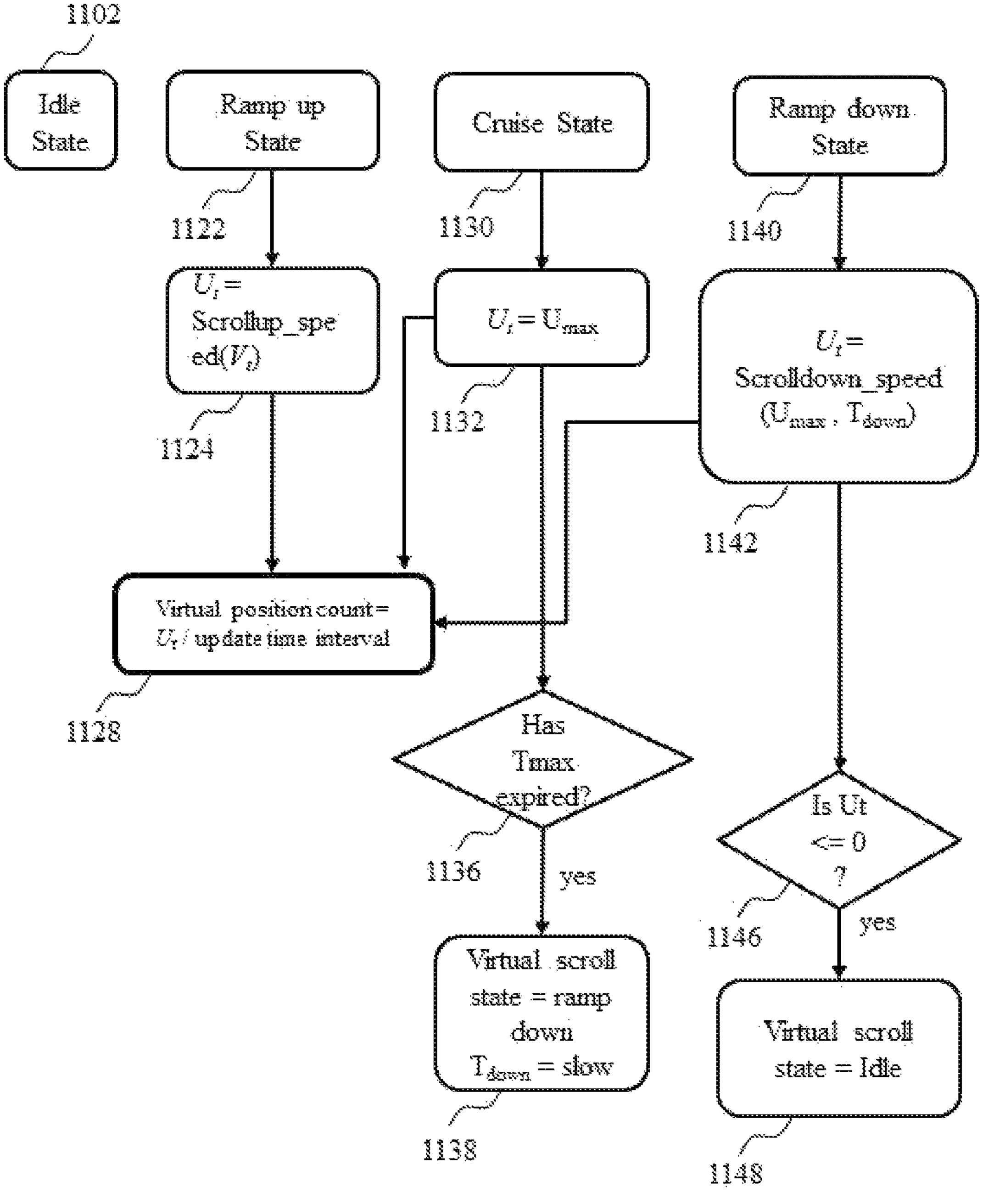
FIG. 11 shows processes relating to each virtual scroll state as described with respect to FIGS. 10A to 10C, according to various embodiments.

FIG. 11 shows processes relating to each virtual scroll state as described with respect to FIGS. 10A to 10C, according to various embodiments. In the idle state 1102, both the input velocity and the output velocity may be zero.

In the ramp up state 1122, the output velocity may be a function of the input velocity. In 1124, the virtual scroll controller 912 may compute $U_t$ based on $V_t$, based on the function $U_t$=Scrollup_speed($V_t$). In 1128, the virtual scroll controller 912 may compute the virtual position count based on $U_t$. The virtual position count may be computed by dividing $U_t$ over the update time interval.

In the cruise state 1130, $U_t$ may maintain at a fairly constant value. In 1132, the virtual scroll controller 912 may set $U_t$ to be at least substantially equal to the last known value of Ut of the ramp up state 1122, which may be Umax=Scrollup_speed($V_{max}$). Next, in 1128, the virtual scroll controller 912 may compute the virtual position count based on $U_t$. In 1136, the virtual scroll controller 912 may determine whether the cruise time $T_{max}$ has expired. If $T_{max}$ has expired, the virtual scroll state may switch to the ramp down state, and Tdown may be set to "slow", in 1138, like shown in FIG. 10A. Otherwise, the virtual scroll state may remain as the cruise state.

In the ramp down state 1140, $U_t$ may decrease. In 1142, the virtual scroll controller 912 may compute $U_t$ based on $U_{max}$ and $T_{down}$, according to the function $U_t$=Scrolldown_speed(Umax, Tdown). The virtual scroll controller 912 may compute the virtual position count based on $U_t$, in 1128. In the ramp down state 1216, $U_t$ may decrease over a ramp down time, to zero. In 1146, the virtual scroll controller 912 may determine whether $U_t$ is less than, or equal to, zero. If $U_t$ is less than, or equal to, zero, the virtual scroll controller 912 may change the virtual scroll state to the idle state 1102. Otherwise, the virtual scroll state may remain as the ramp down state 1140.

According to various embodiments, the input device 900 may have a smart scroll capability. The input device 900 may include the mouse 100. Specifically, when the input velocity exceeds the direct control mode threshold, the electric motor 653 of the mouse 100 may switch the mechanical operation mode of the mouse from the freewheeling mode to the resistive-wheeling mode, by moving the lever 160 to disengage from the arresting surface 142 of the rotatable member 952. In the resistive-wheeling mode, the host interface block 906 may receive the scroll position counter 920 from the position control module 904 and may translate the scroll position counter 920 into a scrolling user input for controlling scrolling. The smart scroll capability may allow the rotatable member 952 to achieve higher physical velocity when it enters into the virtual scroll mode. The scroll wheel control may go back to the resistive-wheeling mode after the output velocity becomes zero again.

Figure 12:
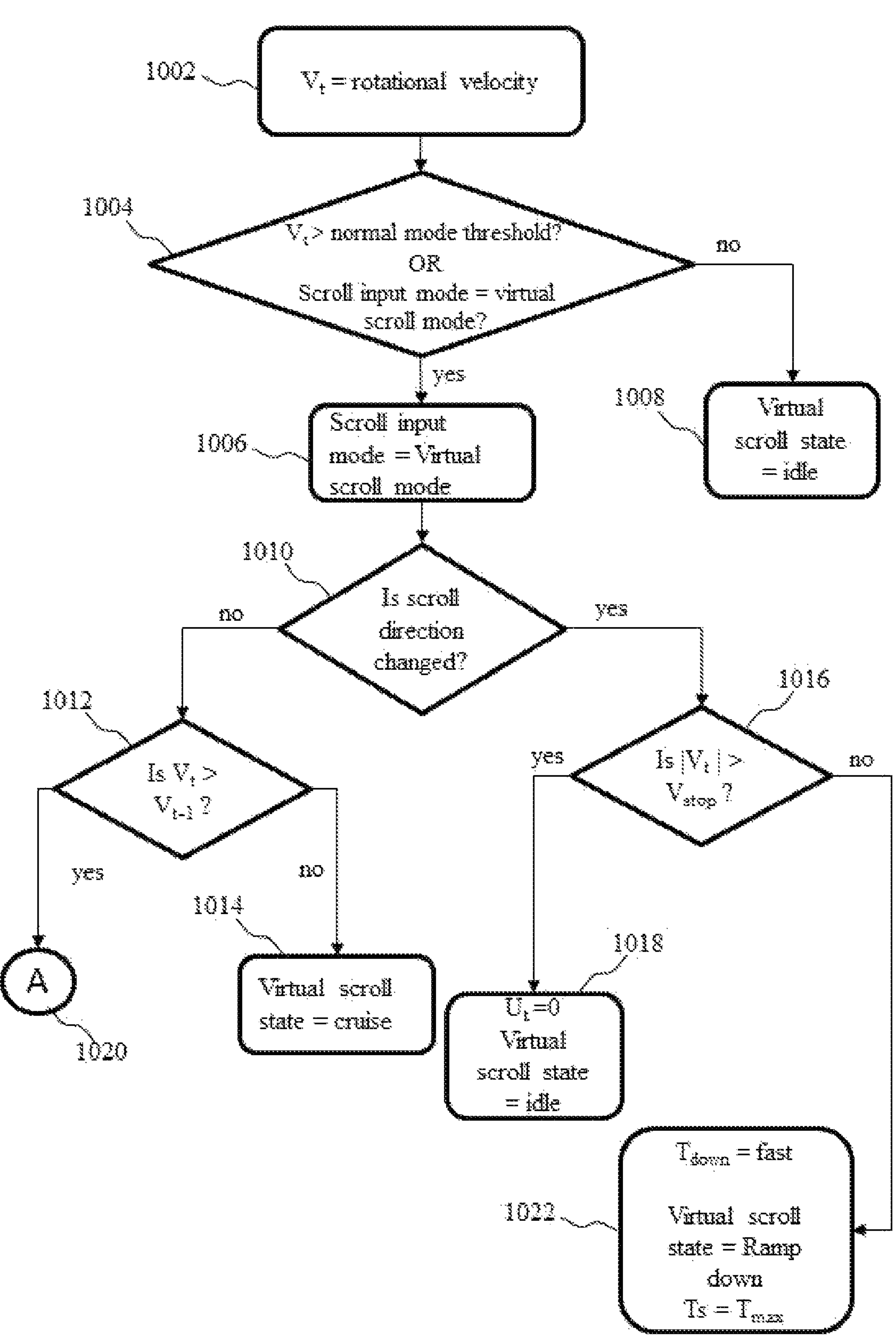
FIGS. 12 and 13 show a flowchart of a method of determining virtual scroll states, according to various embodiments.
Figure 13:
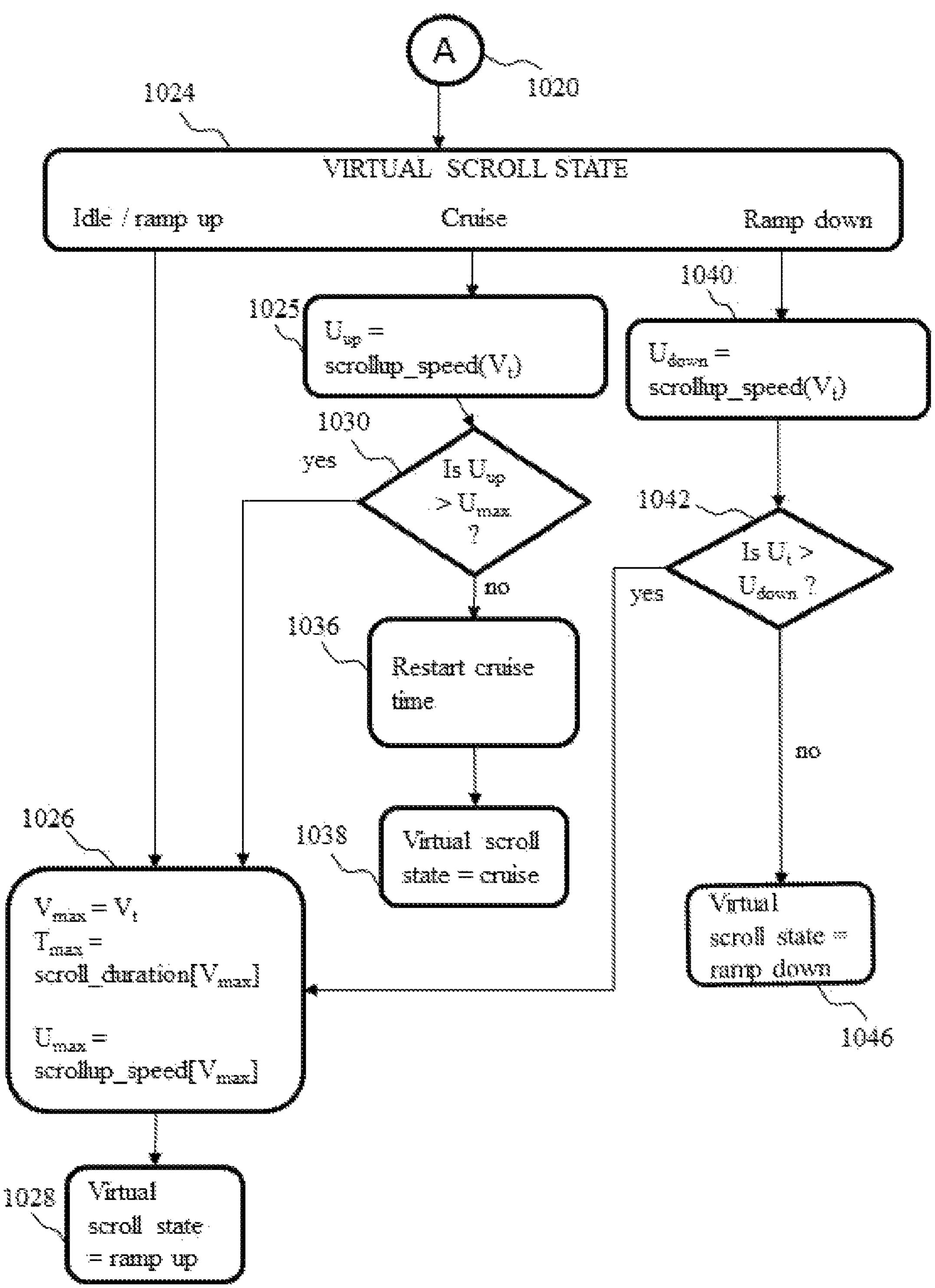

FIGS. 12 and 13 show a flowchart of a method of determining the virtual scroll states, for example, as described in relation to FIGS. 10A to 10C, according to various embodiments.

Referring to FIG. 12, in 1002, the virtual scroll controller 912 may receive information about the input velocity, Vt, from the wheel speed measurement module 908. In 1004, the virtual scroll controller 912 may compare the input velocity against a direct control mode threshold, and determining whether the input velocity is higher than the direct control mode threshold. In 1004, the virtual scroll controller 912 may also determine whether the scroll input mode 924 is the virtual scroll mode. If the input velocity exceeds the direct control mode threshold, or if the scroll input mode 924 is the virtual scroll mode, the virtual scroll controller 912 may output the scroll input mode 924 as the virtual scroll mode, in 1006. Otherwise, the scroll input mode 924 may be the direct control mode, and the virtual scroll controller 912 may output the virtual scroll state as the idle state, in 1008.

If the scroll input mode 924 is the virtual scroll mode, the virtual scroll controller 912 may determine whether there is a change in scroll direction, in 1010. If there is a change in the scroll direction, the virtual scroll controller 912 may determine whether the present input velocity $V_t$, is larger than the input velocity at an immediately preceding time instance, $V_t$_i, in other words, to determine if there is a subsequent rotational input of the rotatable member, such as another quick scroll of the rotatable member, in 1012. If there is another rotational input, the method may proceed to 1020, denoted as "A", which will be described subsequently, with respect to FIG. 12. If there is no subsequent rotational input detected in 1012, the virtual scroll controller 912 may output the virtual scroll state, as the cruise state, in 1014.

If a change in scroll direction is detected in 1010, the virtual scroll controller 912 may proceed to 1016, to determine whether the rotational speed, i.e. magnitude of the rotational velocity in the changed direction, is larger than a braking threshold, VBT. If the rotational speed exceeds the braking threshold, the virtual scroll controller 912 may set $U_t$ to zero and also set the virtual scroll state as idle, in 1018. In other words, if the rotatable member is rotated at a speed higher than the braking threshold, in an opposite direction, the scrolling in the application stops. This action may be referred herein as a 'hard brake' to the scrolling. If in 1016, the rotational speed is determined to be equal, or less than, the braking threshold, the virtual scroll controller 912 may set the virtual scroll state as the ramp down state, in 1022. In 1022, the virtual scroll controller 912 may also set $T_{down}$ to "fast" so that $U_t$ decreases to zero in a short time, like shown in FIG. 10B. In 1022, the virtual scroll controller 912 may also set $T_s$ to be equal to T. to end the cruise state.

Referring to FIG. 13, which continues from 1020 of FIG. 12, in 1024, if the existing scroll state is "idle' or if the existing virtual scroll state is "ramp up", the virtual scroll controller 912 may define a parameter Vmax, and may compute T. and Umax based on Vmax, in 1026. Vmax denotes the maximum input velocity. T. denotes the cruise time in the cruise state. Umax denotes the cruise speed in the cruise state. Vmax may be set as the same value as the present input velocity $V_t$, i.e. Vmax=$V_t$. Each of T. and Umax may be a function of Vmax. For example: T. may be expressed as Tmax scroll_duration($V_{max}$). For example, Umax may be expressed as Umax=scrollup_speed(Vmax). After determining Tmax and Umax, the method may include setting the virtual scroll state as "ramp up", in 1028.

If in 1024, the existing virtual scroll state is "cruise", the virtual scroll controller 912 may compute a new parameter $U_{up}$, in 1025. The virtual scroll controller 912 may compute $U_{up}$ based on the function:

$$Uup=\text{Scrollup\_speed}(Vt).$$

Next, the virtual scroll controller 912 may determine whether $U_{up}$ is larger than Umax, in 1030. If in 1030, it is determined that Uup exceeds Umax, the virtual scroll controller 912 may determine T. and Umax, in 1026. As a result, the virtual scroll state may enter another ramp up state where the output velocity may increase to a higher value, before entering another cruise state, like shown in FIG. 14A.

Conversely, if in 1030, it is determined that $U_{up}$ is less than, or equal to, Umax, the virtual scroll controller 912 may restart the cruise time, i.e. to reset T. to zero, in 1036. Following 1036, the virtual scroll controller 912 may set the virtual scroll state to "cruise" in 1038. As a consequence of resetting the cruise timer, the time duration of the cruise state may be extended, like shown in FIG. 14C.

In 1024, if the existing virtual scroll state is "ramp down", the virtual scroll controller 912 may compute a new parameter $U_{down}$, in 1040. The virtual scroll controller 912 may compute $U_{down}$ according to the function $U_{down}$=scrollup_speed(Vt). The virtual scroll controller 912 may further determine whether the present output speed Ut is larger than Udown, in 1042. If Ut>Udown, the virtual scroll controller 912 may determine $T_{max}$ and Umax, in 1026, and then set the virtual scroll state as ramp up in 1028. As a result, the output velocity may increase to a new maximum value and subsequently, the virtual scroll state may enter another cruise state with the new maximum value as the cruise speed, like shown in FIG. 14B. Otherwise, if $U_t \leq U_{down}$, the virtual scroll controller 912 may set the virtual scroll state as "ramp down", in 1046.

Figure 14A:
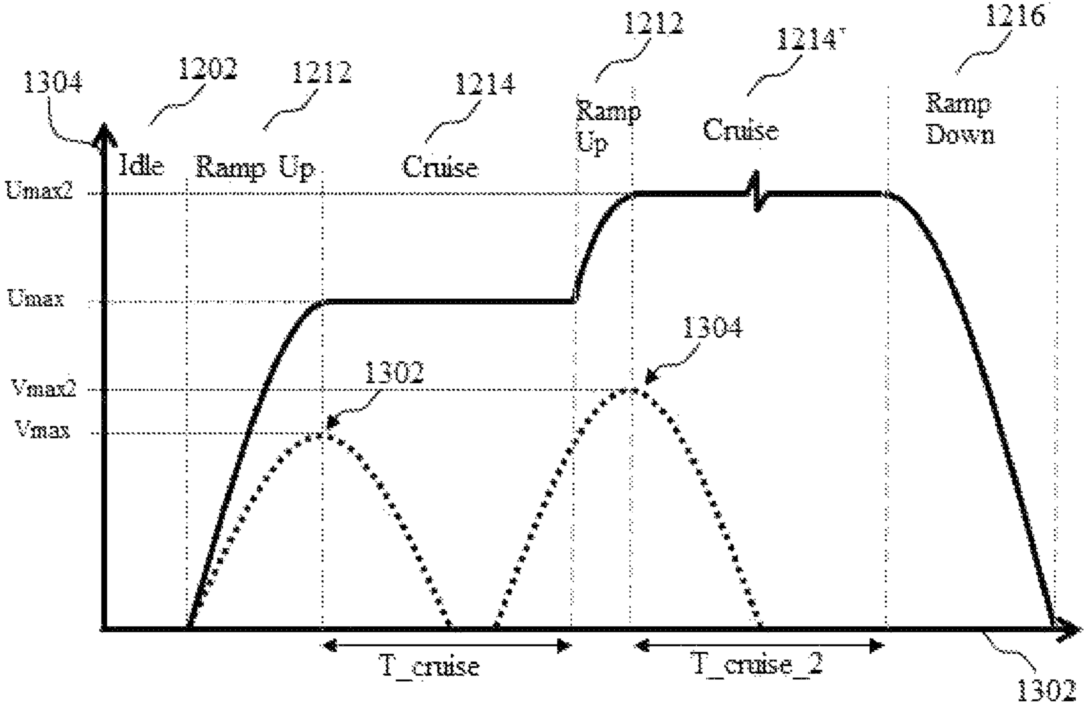
FIGS. 14A to 14C are graphs that illustrate the relationship between an input velocity and an output velocity in the virtual scroll mode, according to various embodiments.
Figure 14B:
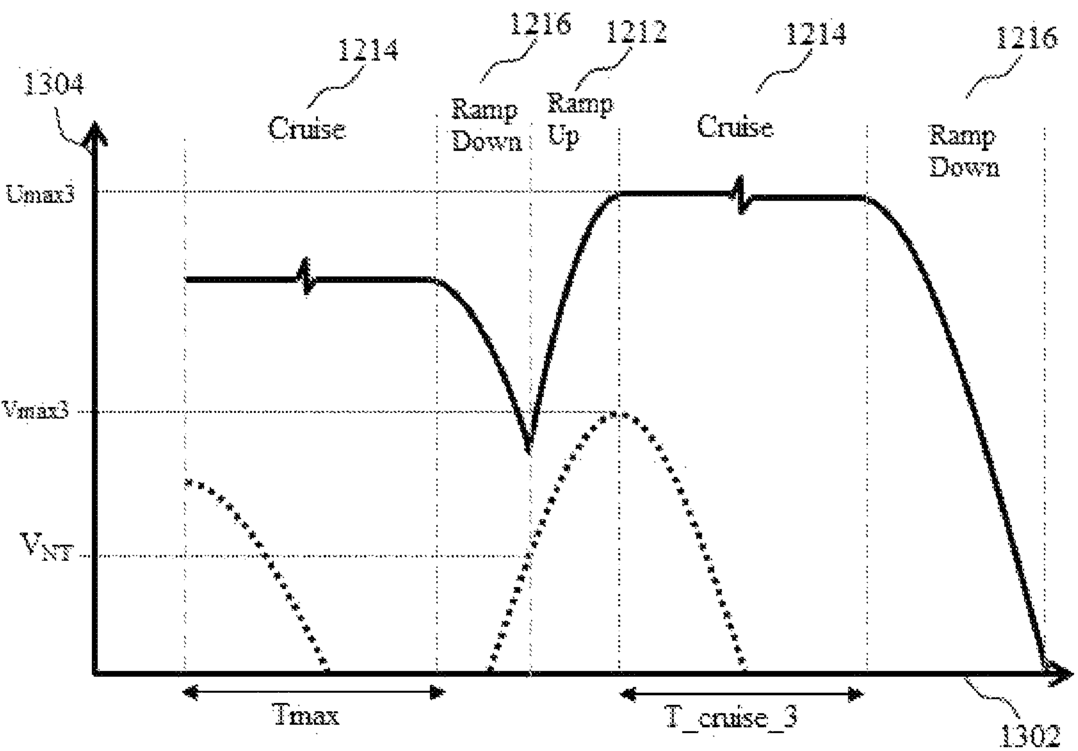
Figure 14C:
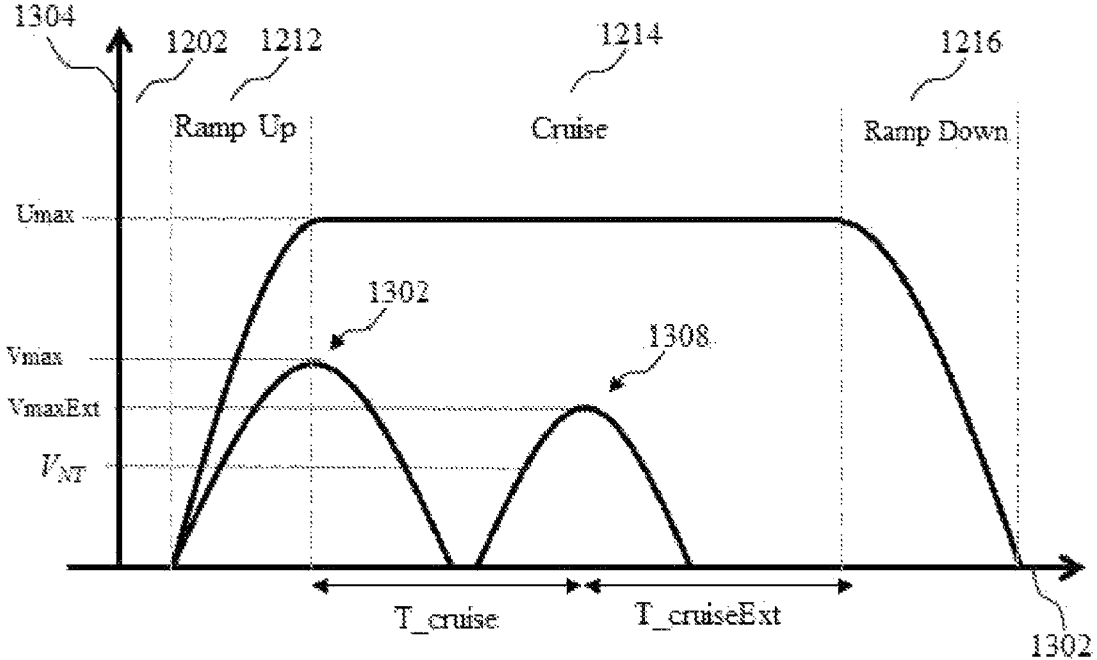

FIGS. 14A to 14C are graphs that illustrate the relationship between the input velocity $V_t$ and the output velocity $U_t$ in the virtual scroll mode, according to various embodiments. FIGS. 14A to 14C are similar to FIGS. 10A to 10C, but further involve a second user input that increases the input velocity.

Referring to FIG. 14A, the virtual scroll state may switch to the cruise state 1214, after the input velocity of the first user input reaches a local maxima 1302, like shown in FIG. 10A. The local maxima 1302 may correspond to a maximum input velocity Vmax, and the scrolling speed in the cruise state 1214 may be Umax. After the input velocity drops to zero, while still in the cruise state 1214, the user may provide a second user input, by rotating the rotatable member again, this time, to a higher maximum input velocity Vmax2 at another maxima 1304. The virtual scroll state may switch to the ramp up state 1212, where the output velocity increases as a function of the input velocity. The virtual scroll state may then switch to a second cruise state 1214' when the input velocity reaches the maxima 1304. As the maxima 1304 is higher than the maxima 1302, the resulting output velocity Umax2 in the second cruise state 1214' may be higher than Umax. The cruise time duration in the cruise state 1214 is denoted as T cruise 2.

FIG. 14B shows the input and output velocities, when the user provides a second user input to increase the scrolling speed, while in the ramp down state 1216. Like shown in FIG. 10A, if no further user input is provided after $T_{max}$, the virtual cruise state may switch from the cruise state 1214 to the ramp down state 1216. If the user provides a second user input such that the input velocity increases past the direct control mode threshold, VDCT, again, the virtual scroll state may switch to the ramp up state 1212, where the output scroll speed increases to Umax3 based on the maximum input speed of Vmax3. Following the ramp up state, the scroll control mode may switch to the cruise state 1214 again, this time with a higher output cruise speed of Umax3. The cruise time duration in the second cruise state 1214 is denoted as T cruise3.

FIG. 14C shows the input and output velocities, when the user provides a second user input to extend the time duration in the cruise state 1214. During the cruise state 1214, after the input velocity has dropped to zero, the user may rotate the rotatable member again so that the input velocity increases past the direct control mode threshold, VDCT. The cruise state may continue for an additional time duration T cruiseExt.

Example 1 is an input device including: a rotatable member; a virtual scroll controller configured to select a virtual scroll state from a plurality of virtual scroll states based on a rotational velocity of the rotatable member, each virtual scroll state associated with a respective output function; wherein the virtual scroll controller is further configured to compute an output velocity according to the output function associated with the selected virtual scroll state, and further configured to generate a virtual position count based on the computed output velocity; and a host interface block configured to send the generated virtual position count to a computing device connectable to the input device.

In example 2, the subject-matter of example 1 can optionally include that the virtual scroll controller is further configured to select a scroll input mode from a group consisting of a direct control mode and a virtual scroll mode, based on the rotational velocity of the rotatable member.

In example 3, the subject-matter of example 2 can optionally include that the host interface block is configured to send the generated virtual position count to the computing device in response to the virtual scroll controller selecting the virtual scroll mode as the scroll input mode.

In example 4, the subject-matter of example 3 can optionally include: a position control module configured to generate a scroll position count based on an amount of rotation of the rotatable member, wherein the host interface block is configured to send the generated scroll position count to the computing device in response to the virtual scroll controller selecting the direct control mode as the scroll input mode.

In example 5, the subject-matter of any one of examples 2 to 3 can optionally include that the virtual scroll controller is configured to select the virtual scroll mode as the scroll input mode, in response to the rotational velocity exceeding a direct control mode threshold.

In example 6, the subject-matter of any one of examples 1 to 5 can optionally include that the virtual position count is non-zero for a time duration longer than a time duration of rotation of the rotatable member.

In example 7, the subject-matter of any one of examples 1 to 6 can optionally include that the plurality of virtual scroll states includes a ramp up state, a cruise state, and a ramp down state.

In example 8, the subject-matter of example 7 can optionally include that according to the output function associated with the ramp up state, the output velocity depends on the rotational velocity and an acceleration factor.

In example 9, the subject-matter of example 8 can optionally include that the acceleration factor is user-definable through a driver software.

In example 10, the subject-matter of any one of examples 7 to 9 can optionally include that according to the output function associated with the cruise state, the output velocity depends on a maximum rotational velocity in the ramp up state.

In example 11, the subject-matter of any one of examples 7 to 10 can optionally include that according to the output function associated with the ramp down state, the output velocity depends on a deceleration factor.

In example 12, the subject-matter of example 11 can optionally include that the deceleration factor is user-definable through a driver software.

In example 13, the subject-matter of any one of examples 1 to 12 can optionally include: a light emitter; and a light emitter control circuit configured to control operation of the light emitter based on the virtual position count.

In example 14, the subject-matter of any one of examples 1 to 13 can optionally include: an encoder configured to generate pulses based on rotation of the rotatable member; and a wheel speed measurement module configured to determine the rotational velocity based on an average frequency of the generated pulses.

Example 15 is a method of providing a scrolling input to a computing device. The method includes: selecting a virtual scroll state from a plurality of virtual scroll states based on a rotational velocity of a rotatable member of an input device, wherein each virtual scroll state is associated with a respective output function; computing an output velocity according to the output function associated with the selected virtual scroll state; generating a virtual position count based on the computed output velocity; and sending the generated virtual position count to a computing device connected to the input device.

In example 16, the subject-matter of example 15 can optionally include: selecting a scroll input mode from a group consisting of a direct control mode and a virtual scroll mode, based on the rotational velocity of the rotatable member; and sending the generated virtual position count to the computing device in response to selecting the virtual scroll mode as the scroll input mode.

In example 17, the subject-matter of any one of examples 15 to 16 can optionally include that the plurality of virtual scroll states includes a ramp up state, a cruise state, and a ramp down state.

In example 18, the subject-matter of example 17 can optionally include that according to the output function associated with the ramp up state, the output velocity depends on the rotational velocity and a user-definable acceleration factor.

In example 19, the subject-matter of any one of examples 17 to 18 can optionally include that according to the output function associated with the cruise state, the output velocity depends on a maximum rotational velocity in the ramp up state.

In example 20, the subject-matter of any one of examples 17 to 19 can optionally include that according to the output function associated with the ramp down state, the output velocity depends on a user-definable deceleration factor.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. An input device comprising:

a rotatable member;

a virtual scroll controller configured to select a virtual scroll mode as a scroll input mode in response to a rotational velocity of the rotatable member and output an output velocity in the virtual scroll mode, wherein in response to the rotational velocity decreasing from an input value to zero, the output velocity maintains at a constant output value for a cruise time period in a cruise state and drops to zero in a ramp down state, wherein the cruise time period depends on the input value.

2. The input device of claim 1, wherein the virtual scroll controller is further configured to select a scroll input mode from a group consisting of a direct control mode and a virtual scroll mode, based on the rotational velocity of the rotatable member.

3. The input device of claim 2, further comprising:

a host interface block;

an encoder configured to detect pulses generated by at least one switch of the rotatable member when the rotatable member rotates;

a position control module comprising:

a receiver configured to receive the pulses from the encoder;

a counting unit configured to generate a scroll position count by counting a number of the pulses received from the encoder; and a transmission unit configured to transmit the scroll position count to the host interface block, wherein the host interface block is configured to send the scroll position count to the computing device in response to the virtual scroll controller selecting the direct control mode as the scroll input mode.

4. The input device of claim 2, further comprising:

one or more light emitters; and a light emitter control circuit configured to control operation of the light emitters based on the scroll input mode.

5. The input device of claim 1, wherein the virtual scroll controller is further configured to generate a virtual position count based on the output velocity; and wherein the input device further comprises a host interface block configured to send the generated virtual position count to a computing device connectable to the input device.

6. The input device of claim 5, wherein the virtual position count is non-zero for a time duration longer than a time duration of rotation of the rotatable member.

7. The input device of claim 1, wherein in response to the rotational velocity of the rotatable member increasing to a maximum input value, the output velocity increases in a ramp up state and reaches a maximum output value, wherein according to an output function associated with the ramp up state, the output velocity in the ramp up state depends on the rotational velocity and an acceleration factor.

8. The input device of claim 7, wherein the acceleration factor is user-definable through a driver software.

9. The input device of claim 1, wherein the output velocity starts to drop to zero at an increased deceleration rate when the rotational velocity of the rotatable member becomes a negative input velocity and has a value that exceeds a fast ramp down threshold value.

10. The input device of claim 9, wherein the output velocity is reduced to zero when the rotational velocity of the rotatable member is a negative input velocity and has a value that exceeds a braking threshold value, wherein the braking threshold value is greater than the fast ramp down threshold value.

11. The input device of claim 1, wherein according to an output function associated with the cruise state, the output velocity in the cruise state depends on the input value of the rotational velocity.

12. The input device of claim 1, wherein according to an output function associated with the ramp down state, the output velocity in the ramp down state depends on a deceleration factor that is user-definable through a driver software.

13. The input device of claim 1 further comprising a smart scroll capability to switch between a free-wheeling mode and a resistive-wheeling mode based on the rotational velocity.

14. The input device of claim 1, further comprising:

an encoder configured to detect pulses generated by at least one switch of the rotatable member when the rotatable member rotates; and a wheel speed measurement module comprising:

a receiver configured to receive the pulses from the encoder;

a measurement unit configured to measure an average frequency of the pulses by counting a number of the pulses received over a measurement period; and a calculation unit configured to compute the rotational velocity based on the average frequency of the pulses.

15. The input device of claim 1, wherein in response to the rotational velocity of the rotatable member increasing from zero to a lower maximum input value, subsequently decreasing to zero, subsequently increasing to a maximum input value and subsequently decreasing to zero, the output velocity increases from zero to a lower maximum output value, subsequently remains at the lower maximum output value for an initial cruise time period in an initial cruise state, subsequently increases to a maximum output value, subsequently remains at the maximum output value for the cruise time period in the cruise state, and subsequently drops to zero in the ramp down state, wherein the lower maximum input value is lower than the maximum input value, and the lower maximum output value is lower than the maximum output value.

16. The input device of claim 1, wherein in response to the rotational velocity of the rotatable member increasing from zero to a maximum input value, subsequently decreasing to zero, subsequently increasing to a lower maximum input value, and subsequently decreasing to zero, the output velocity increases from zero to a maximum output value in a ramp up state, subsequently remains at the maximum output value for the cruise time period in the cruise state, subsequently remains at the maximum output value for a second cruise time period in a second cruise state, and subsequently drops to zero in the ramp down state, wherein the lower maximum input value is lower than the maximum input value.

17. A method implemented by an input device comprising a rotatable member and a virtual scroll controller, the method comprising:

selecting, by the virtual scroll controller, a virtual scroll mode as a scroll input mode in response to a rotational velocity of the rotatable member; and outputting an output velocity in the virtual scroll mode by the virtual scroll controller, wherein in response to the rotational velocity decreasing from an input value to zero, the output velocity maintains at a constant output value for a cruise time period in a cruise state and drops to zero in a ramp down state, wherein the cruise time period depends on the input value.

18. The method of claim 17, further comprising:

generating, by the virtual scroll controller, a virtual position count based on the output velocity; and sending, by a host interface block, the generated virtual position count to a computing device connected to the input device.

19. The method of claim 17, wherein in response to the rotational velocity of the rotatable member increasing to a maximum input value, the output velocity increases in a ramp up state and reaches a maximum output value, wherein according to an output function associated with the ramp up state, the output velocity in the ramp up state depends on the rotational velocity and a user-definable acceleration factor.

20. The method of claim 17, wherein according to an output function associated with the cruise state, the output velocity in the cruise state depends on the maximum input value of the rotational velocity.

* * * * *